US009621741B2

(12) United States Patent
Caviedes et al.

(10) Patent No.: US 9,621,741 B2
(45) Date of Patent: Apr. 11, 2017

(54) TECHNIQUES FOR CONTEXT AND PERFORMANCE ADAPTIVE PROCESSING IN ULTRA LOW-POWER COMPUTER VISION SYSTEMS

(71) Applicant: Intel Corporation, Santa Clara, CA (US)

(72) Inventors: Jorge E. Caviedes, Mesa, AZ (US); Sin Lin Wu, Tempe, AZ (US); Artem Zinevich, San Jose, CA (US); Frank Ghenassia, Tel Aviv (IL); Dmitri Bitouk, Orinda, CA (US)

(73) Assignee: INTEL Corporation, Santa Clara, CA (US)

( * ) Notice: Subject to any disclaimer, the term of this patent is extended or adjusted under 35 U.S.C. 154(b) by 0 days.

(21) Appl. No.: 14/566,226

(22) Filed: Dec. 10, 2014

(65) Prior Publication Data
US 2016/0173752 A1 Jun. 16, 2016

(51) Int. Cl.
H04N 1/00 (2006.01)
H04N 5/232 (2006.01)

(52) U.S. Cl.
CPC ..... H04N 1/00204 (2013.01); H04N 5/23229 (2013.01); H04N 5/23241 (2013.01)

(58) Field of Classification Search
CPC .......... H04N 5/23245; H04N 5/23241; H04N 5/23229
See application file for complete search history.

(56) References Cited

U.S. PATENT DOCUMENTS

| 2013/0156297 A1* | 6/2013 | Shotton | G06K 9/6255 382/159 |
| 2014/0132786 A1* | 5/2014 | Saitwal | H04N 5/23267 348/208.99 |
| 2014/0347511 A1* | 11/2014 | Rodriguez-Serrano | H04N 5/23222 348/222.1 |
| 2014/0368688 A1* | 12/2014 | John Archibald | H04N 5/23241 348/222.1 |
| 2015/0381963 A1* | 12/2015 | Dal Mutto | H04N 5/265 348/46 |

* cited by examiner

Primary Examiner — Mekonnen Dagnew
(74) Attorney, Agent, or Firm — Finch & Maloney PLLC

(57) ABSTRACT

Techniques are disclosed to adaptively control an image sensor and image signal processor (ISP), collectively known as an image pipeline, such that a minimum amount of power is consumed by an electronic device while producing images that can be accurately analyzed by a computer vision application. The techniques disclosed herein can be implemented in various electronic devices capable of capturing and processing image data, such as, for example, smart phones, wearable computers, laptops, tablets, and other mobile computing or imaging systems. In an embodiment, the techniques disclosed herein are implemented in a system-on-chip device.

20 Claims, 11 Drawing Sheets

TECHNIQUES FOR CONTEXT AND PERFORMANCE ADAPTIVE PROCESSING IN ULTRA LOW-POWER COMPUTER VISION SYSTEMS

BACKGROUND

Cameras have become ubiquitous elements in mobile electronic devices such as laptops, tablets, smart phones, and wearable computer devices. Originally intended for the purpose of capturing still images and video, these camera-enabled devices have spurred the development of mobile computer vision applications, such as fiducial detection, object identification, and gesture recognition. To acquire images for processing, vision-enabled applications perform image sensing through an image sensor and image signal processor (ISP). However, each image captured is at the expense of device resources such as power (e.g., hundreds of milliWatts per captured image). To this end, many consumer vision applications, such as those available on mobile platforms like smartphones, tablets, and wearable electronics featuring cameras are relatively constrained.

DETAILED DESCRIPTION

Figure 1:
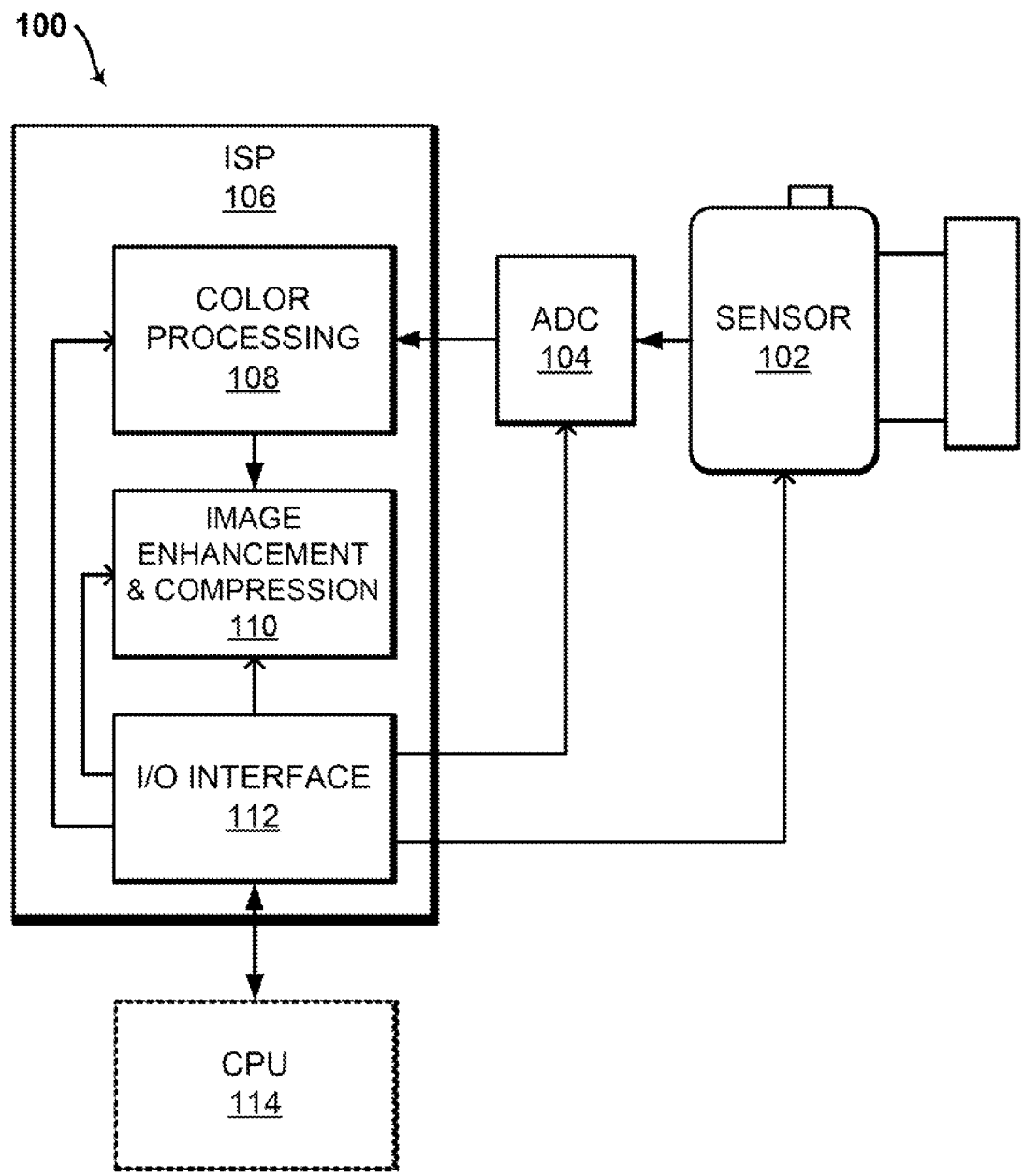
FIG. 1 illustrates one example of a sub-optimal image pipeline including an image sensor and associated image signal processor (ISP).

Techniques are disclosed to adaptively control an image sensor and image signal processor (ISP), collectively known as an image pipeline, such that a minimum or otherwise reduced amount of power is consumed by an electronic device while producing image data that can be accurately analyzed by a computer vision (CV) application or a visual understanding (VU) application, all of which are generally referred to herein as CV applications for purposes of simplicity. The techniques are based in a recognition that performance requirements are different for CV applications than they are for higher-end applications such as image editing. For instance, when power and workload headroom allow a given application to run at maximum frame rate and full image processing, as expected for high-end imaging, such maximum allowable frame rates and full processing are typically not needed for a given CV application. To this end, allowing such maximum frame rates and full processing is effectively sub-optimal for the needs of CV applications. The techniques can be implemented in various electronic devices capable of capturing and processing image data, such as, for example, smart phones, wearable computers, laptops, tablets, system-on-chip configurations for imaging applications, and other mobile computing devices that are generally power-constrained. In an embodiment, a controller is incorporated into the camera processing pipeline of an imaging system. The controller controls the camera sensor and processing and implements a power optimization policy subject to requirements of a given CV application. In operation, the controller receives feedback from the CV application which communicates performance requirements and dynamically drives the camera pipe configuration and settings. The controller may also receive inputs from other modules that inform the overall control scheme, such as data from a signal metrics module (e.g., for providing metrics such as sharpness, noise and contrast data), data from a motion estimation module and/or extant gyro and position sensors (e.g., for detecting changes in the environment), and data from a power and workload controller (e.g., for providing boundaries of operation within which the camera pipeline operates). In any such cases, the controller enables an adaptive feedback loop such that performance indications communicated by the CV application cause the image pipeline to be reconfigured in a manner that is optimal for performing a given CV task. In addition, some embodiments may be configured to dynamically reconfigure or otherwise adjust at least one of the image sensor and the image signal processor according to computer vision tasks to be performed, so as to allow a continuous monitoring mode that is power efficient. As will be appreciated in light of this disclosure, existing solutions provide ISP modes that are optimized only for either still image or video capture. Such modes cannot be used for performing computer vision tasks in a continuous mode due to high power consumption associated with image capture and processing.

General Overview

As previously discussed, cameras are ubiquitous elements in modern electronic devices and typically include high-end imaging components such as mega-pixel image sensors and sophisticated ISPs with complex post-capture processing algorithms designed to produce high-quality images. FIG. 1 illustrates an example of one such example image pipeline 100 within an electronic device (e.g., smart phone, laptop computer, tablet computer, desktop computer, or dedicated imaging system). As shown, the image pipeline 100 includes an image sensor 102 coupled to an analog-to-digital conversion (ADC) stage 104. The image sensor 102 may be, for example, a complementary metal oxide semiconductor (CMOS) sensor, or in some cases a charge coupled device (CCD). Raw image data captured by the image sensor 102 is digitized by the ADC 104 and processed through the ISP 106 in order to render a human-perceivable image for storage and/or presentation. As shown, processing of the digitized image data by the ISP 106 begins with color processing module 108, followed by image enhancement and compression module 110. In some cases, the ISP 106 may include additional conventional image enhancements such as image stabilization and red-eye reduction. Input/output (IO) interface 112 provides a means by which CPU 114 of an electronic device (not shown) can initiate image capture and receive processed image data. Provided there is sufficient power resources and workload envelope (e.g., processor cycles, available memory), the pipeline 100 may execute capture and processing of image data as described above utilizing the image pipeline 100. However, conventional processing utilizing the image pipeline 100 remains primarily focused on capturing and processing raw image data from image sensor 102 to achieve an image quality which is subjectively pleasing to an end-user. To this end, the output of the image pipeline 100 defaults to or otherwise presumes the need for high quality, human-perceivable, image data regardless of the actual needs of downstream applications of the electronic device. Thus the image pipeline 100 remains largely a black box that a vision-enabled application has limited control over. This limited control of an image pipeline is particularly problematic for so-called "always-on" capture that quickly depletes available power in conventional electronic devices such as, for example, smart phones and wearable computer devices.

Thus, and in accordance with an embodiment of the present disclosure, techniques are disclosed for dynamically adjusting an image pipeline based on the performance requirements of a given CV task, or sometimes referred to as a visual understanding task. As used herein, a CV task is defined as one or more routines or functions designed to derive meaningful or otherwise useful information from an observed scene (e.g., captured image data). A non-exhaustive list of such tasks includes, for instance, optical character recognition (OCR), facial recognition, gesture recognition, object identification, fiducial detection and other such image processing tasks appropriate for a CV application. As used herein, a CV application is defined as a high-level process that leverages such CV tasks to perform CV functions such as, for example, turn-by-turn navigation, autonomous robot control, OCR scanning and document conversion, facial recognition, and gesture-based navigation of a user interface, just to name a few. Numerous other CV applications will be apparent in light of this disclosure. In an embodiment, the CV image pipeline can support various types of image sensors (e.g., CMOS, CCD, hybrid CCD/CMOS, or any other image sensor technology that can generate digital imagery). In addition, the CV image pipeline can support sensors configured to capture different types of scene data, for example, color image data (RGB), color and depth image data (RGBD camera), depth sensor, stereo camera (L/R RGB), YUV, infrared signals, and x-rays.

In an embodiment, an adaptive CV image pipeline is configured with a CV controller and supporting modules configured to receive instructions to perform image capture for the purpose of CV processing. Some such supporting modules include an ISP, a signal metrics processor, a motion estimation module, and a power and workload controller. In some example cases, the CV controller and supporting modules can comprise a system-on-chip (SoC) device. Aspects of the CV controller and supporting modules in the context of CV processing will be discussed in turn. The CV controller enables a CV application, such as a computer program product or so-called "App" to initiate capture of image data for CV processing. Unlike conventional image capture routines, the CV controller enables the CV application to specify certain performance requirements when initiating or otherwise carrying out image capture to optimize image quality and power consumption at an onset of a given CV task. In an embodiment, the CV controller receives a request to initiate image capture that includes CV task identifier. In this embodiment, the CV controller can include a plurality of CV task-specific configurations whereby each CV task-type includes a corresponding CV task-specific configuration. Further, each CV task-specific configuration can comprise capture parameters or so-called metrics for the ISP (e.g., which post-capture routines to apply) and for the image sensor (e.g., capture mode, contrast, sharpness, and shutter speed/delay) that is optimized to produce image data with qualities well-suited for a given CV task. For instance, an OCR configuration for the ISP and image sensor can include, among other things, a contrast setting, a frame rate, a resolution, a target signal-to-noise ratio, just to name a few. Alternatively, or in addition to the predefined CV task-specific configurations, the CV controller can receive performance requirements directly from the CV application. To this end, the CV application can control image capture with a high degree of granularity, or use default configurations provided within the CV controller. In any such cases, the CV controller includes a plurality of predefined image signal profiles that include best-case image signal characteristics (e.g., contrast, sharpness, noise) for each type of CV task for which a CV application can request image capture. To this end, the CV controller can adjust capture settings such that, at an onset of a CV task, the image sensor and ISP produce image data with characteristics (e.g., resolution, contrast, sharpness, noise) that comport with signal characteristics known to produce images suitable for the given CV task.

In an embodiment, the CV controller can intelligently enforce power constraints (or policies) of an electronic device based on predefined CV task-specific power profiles stored in the CV power and workload controller. In this embodiment, each power profile includes an estimated power consumption (e.g., in milliWatts) for each type of CV task (e.g., per frame of data, per milliseconds of capture). To this end, the CV controller can utilize input from the CV power and workload controller to determine if, for example, a request to capture image data for a given CV task would substantially deplete battery power, and thus, degrade or otherwise prevent CV analysis. In some cases, the CV controller may prevent image capture from occurring until, for example, enough power is available to perform image capture for a given CV task. In other cases, the CV controller may adjust image capture configuration in manner that comports with a power policy (e.g., low-power, medium-power, high-power) that governs power usage. For example, each power policy can enforce power saving measures (e.g., low-power mode/configuration) such that a capture configuration utilizes less power such as, for example, capturing images with less resolution, capturing images at a lower frame rate, and/or a applying a minimum number of post-capture routines via the ISP. As discussed further below with regard to FIG. 2A, power consumption for each type of CV task can be stored in CV task-specific power profiles. In an embodiment, these CV task-specific power profiles can be utilized to determine if a particular CV task is incompatible with a current power policy (e.g., consumes too much power). In other embodiments, these CV task-specific power profiles can be utilized to select a particular configuration that comports with the current power policy in effect. For example, each CV task can have a CV task-specific profile corresponding to a low-power, medium-power, and high-power configuration whereby each of these configuration includes ISP/image sensor settings tailored to each potential power policy enforced by the device. In any such embodiments, a selected power policy can be enforced such that a capture configuration does not exceed or otherwise substantially deplete available power resources.

In an embodiment, the CV controller can automatically adjust image capture configuration based on monitoring on-going performance of a CV application. In this embodiment, the CV controller is communicatively coupled to signal metrics processor configured to measure characteristics (e.g., contrast, noise, sharpness) of an image signal captured by the image sensor and communicate the same, in real-time, to a CV application. As discussed above, the CV controller enables CV applications to initiate image capture by specifying, among other things, a particular CV task. These instructions to initiate image capture can also enable a bi-directional communication channel (e.g., optical interconnect, physical bus, RF/Wireless interconnects, TCP socket, carbon nanotube (CNT) interconnects) between the CV controller and the CV application. In an embodiment, the CV application can communicate performance indications such as, for example, a confidence score (accuracy score) to the CV controller. A confidence score can be, for example, a value between 0 and 100% (or 0.0 to 1.0), or a binary zero or one, that represents how successful a CV application has been performing CV analysis on captured image data. In some cases, the CV controller can utilize positive/high confidence scores (e.g., greater than some predefined value such as 50%, 75%, 90%, and so forth) as indications or triggers to "learn" best-case image signal characteristics for a given CV task, and store these metrics/values in best-case image signal profiles for subsequent use. In other cases, the best-case image signal characteristics can be predetermined during, for example, manufacture of an electronic device, or otherwise theoretically and/or empirically determined. In any such cases, each CV task can have one or more corresponding image signal profiles that enable the CV controller to make intelligent decisions as to whether captured image data quality is suitable for a given CV task. For example, consider a facial recognition task that detects a face within an image (based on shape/geometry) but cannot distinguish the identity of the detected face because of image quality issues such as noise. In this example, the CV application can communicate a confidence score of, for instance, 50%, or another appropriate value based on the outcome of the CV task. In response to receiving a low-confidence score (e.g., less than some predefined value such as 50%), the CV controller can compare measured image signal characteristics to a predefined image signal profile having best-case image signal characteristics for the given CV task. Continuing the example, the CV controller may detect noise being the cause for the low-confidence score based on the difference between a measured noise value and a corresponding best-case noise metric exceeding a predetermined threshold (e.g., 2%, 5%, 10%, 20%, and so on). To this end, the CV controller can correct such a deviation by applying a corrective configuration to the image sensor and/or ISP to the extent necessary to correct for the identified deficiency. Additional examples of a corrective configuration include enabling a flash, enabling auto-focus, enabling auto-exposure. In some cases, the CV controller can reconfigure the ISP (e.g., to filter noise, or perform other post-process routines) to reprocess captured image data to the extent necessary to avoid unnecessarily capturing additional image frames with new configuration settings. In addition, the CV controller can focus on a ROI that contains salient pixels (e.g., skin pixels) when reprocessing image data through the ISP to improve CV analysis by the CV application. Note that the aforementioned reconfiguration of the ISP/image sensor by the CV controller can be subject to power constraints of the electronic device. For example, the CV controller may take a less aggressive approach to correct a determined image signal deficiency by, for instance, incrementally improving characteristics (e.g., resolution, frame rate) or using the least power-hungry routines within an ISP to process/reprocess captured image data. As will be appreciated in light of this disclosure, the CV controller enables an adaptive feedback loop such that image signal quality is adjusted to meet ongoing CV performance needs while observing device power constraints.

In another embodiment, instructions to perform image capture by a CV application may be subject to the CV controller determining that an estimated amount of motion would prevent successful CV processing of captured image data. For example, consider that if a CV application communicates instructions to capture image data for a facial recognition task while an electronic device is in motion, such captured image data could be unsuitable for such processing (e.g., too blurry). To this end, the CV controller may determine motion (acceleration) based on sensor data received from, for example, a communicatively coupled gyro sensor and/or accelerometer. In such cases, the CV controller can communicate to the CV application that the task cannot be performed, and communicate a task-failure reason detailing the same. Alternatively, or in addition to, the task-failure reason, the CV controller can apply a corrective configuration, as discussed above, such that image data is reprocessed through the ISP with one or more post-process routines enables and/or disables. Moreover, corrective configurations could also include configuring the image sensor to, for example, capture at a faster shutter speed/delay, capture in a burst-capture mode, and/or any other mode that otherwise corrects for deficiencies caused by motion.

As discussed above, an embodiment disclosed herein includes an adaptive CV image pipeline configured with a CV-enabled ISP that enables an electronic device to operate in an ultra-low power, so-called "always-on" mode. As will be appreciated in light of this disclosure, this always-on mode is particularly well-suited for power-constrained computing devices such as wearable computing devices, smart phones, and laptops. For example, Google Glass™ by Google® includes an image sensor which can take approximately 800 pictures before depleting available battery power. The techniques variously disclosed herein allows a similarly constrained computing device to operate in a continuous, always-on, CV mode for a substantially longer period of time as image data quality is controlled such that predominately low visual quality (e.g., at least one of low-resolution and luminance-only) images are captured with minimal post-capture processing applied (but of sufficient signal quality and strength for low-level CV processing). In an embodiment, the CV-enabled ISP comprises a system-on-chip (SoS) device.

In still other embodiments, the adaptive CV image pipeline includes a CV-enabled ISP with an integrated CV module. The CV module enables dynamic configuration of the ISP and image sensor such that a configuration of the CV image pipeline initially captures images in an ultra-low power capture mode. As used herein, ultra-low power capture mode is defined as an ISP/image sensor configuration that enables capturing of low-quality image data to detect CV-events utilizing a minimum or otherwise reduced amount of power relative to a full-power capture mode. Such low-quality image data can be luminance-only images (e.g., lacking chrominance (color)). To this end, the CV module can continuously monitor the low-quality image data to detect CV trigger-events such as, for example, a change in an incident light pattern, a manual button press, or other input. If such a CV trigger-event is detected, and in accordance with an embodiment, the CV module can dynamically adjust configuration of the ISP and image sensor to capture image data in a medium-quality mode (e.g., medium resolution, with chrominance). The CV module enables the processing of the medium-quality image data to detect identifiable elements and classify an observed scene as depicting, for example, a hand gesture, a text document, a face, etc. Further, the CV module enables the determination of a scene context (e.g., brightly-lit outdoor scene, dimly-lit indoor scene, etc.). It should be appreciated in light of this disclosure that such classification is not limited to a so called "hard-decision" of a single CV task; rather, the CV module can assign each type of CV task a corresponding likelihood score. To this end, likelihood scores can be utilized by the CV module to make certain inferences as to what CV tasks could be performed based on features within an observed scene. The CV module, as variously disclosed herein, could be accurately described as providing context-aware CV processing. For example, an indoor scene depicting a text document can be analyzed by the CV module and a corresponding likelihood score will naturally favor an OCR task with indoor image enhancements. Note, in this example context may be derived based on, for instance, low light levels or other visible indications that enable an indoor context to be theoretically or empirically determined. Based on determining the particular context, such as an indoor scene, light levels may be increased through use of a flash, noise filtering, and other types of enhancements appropriate for indoor scenes or other contexts where such enhancement may be beneficial. Once a CV task has been selected by the CV module, and in accordance with an embodiment, the CV module can configure the ISP and image sensor in a manner that is optimized for performing the CV task on a next image frame. Consider, in another example, if a hand gesture is detected in an observed scene. In this example, the CV module will likely infer gesture recognition is appropriate in a subsequent frame. So, the CV module can dynamically adjust the ISP and sensor configuration such that resolution and quality of produced images is well-suited for the task (but still consumes a minimum amount of power). In the prior example, medium-quality images are generally sufficient for gesture recognition. However, other CV tasks such as OCR benefit from full-resolution luminance-channel images. So, the CV module enables dynamic adjustment of the ISP and image sensor configuration such that image data is produced with CV task-specific qualities to maximize the potential of successful CV processing of a current image frame, or at the very least, successful CV processing of a subsequently captured image frame.

Once a CV task is to be performed by the CV module, and in accordance with an embodiment, the CV module can utilize CV task-specific low-level feature extraction parameters corresponding to the given CV task to produce symbolic representations of visual features within the captured images. For example, if an OCR task is performed, the CV module utilizes OCR-specific low-level feature extraction routines to convert image data into symbolic representations. Likewise, the CV module can select CV task-specific processing routines that can interpret the symbolic representations and convert the same into, for example, an identified gesture, text characters, or other actionable or computer-usable information. It should be appreciated in light of this disclosure that the CV-module can be advantageously utilized as a trigger or catalyst such that high-level CV applications can leverage the always-on features to perform additional or otherwise more resource-intensive operations. For example, consider that a hand-gesture detected by the CV module can be used to launch, for instance, an OCR or facial recognition computer program on an electronic device. To this end, an electronic device may be configurable such that events received from the CV module can be programmed to cause, for instance, an application to launch, a command to be executed, a message to be displayed via a display, a text message to be sent, or a phone call to be made. Note that if the CV module derives meaningful information from an observed scene (e.g., a string of text characters via OCR, a hand gesture, a face), such information could be utilized in conjunction with or otherwise used in any of the aforementioned examples. Likewise, it should be appreciated that if the CV module fails to derive meaningful data (due to, for example, OCR failure or facial recognition failure), the CV module may communicate additional requirements to the CV controller, which could take additional action such as re-processing or re-capturing image data such that an attempt to carry out the CV task is retried before a failure can be reported or otherwise acted upon by an electronic device (e.g., to display a failure message, to suggest realigning an image camera, or to suggest additional light).

In an embodiment, the CV module returns to ultra-low power processing after, for example, the CV module no longer detects identifiable elements and/or no longer derives meaningful data from an observed scene. To this end, the CV module can cause the CV image pipeline to enter a standby/sleep for a predetermined period of time before returning to the ultra-low power capture mode and repeating image processing as described above.

System Architecture

Figure 2A:
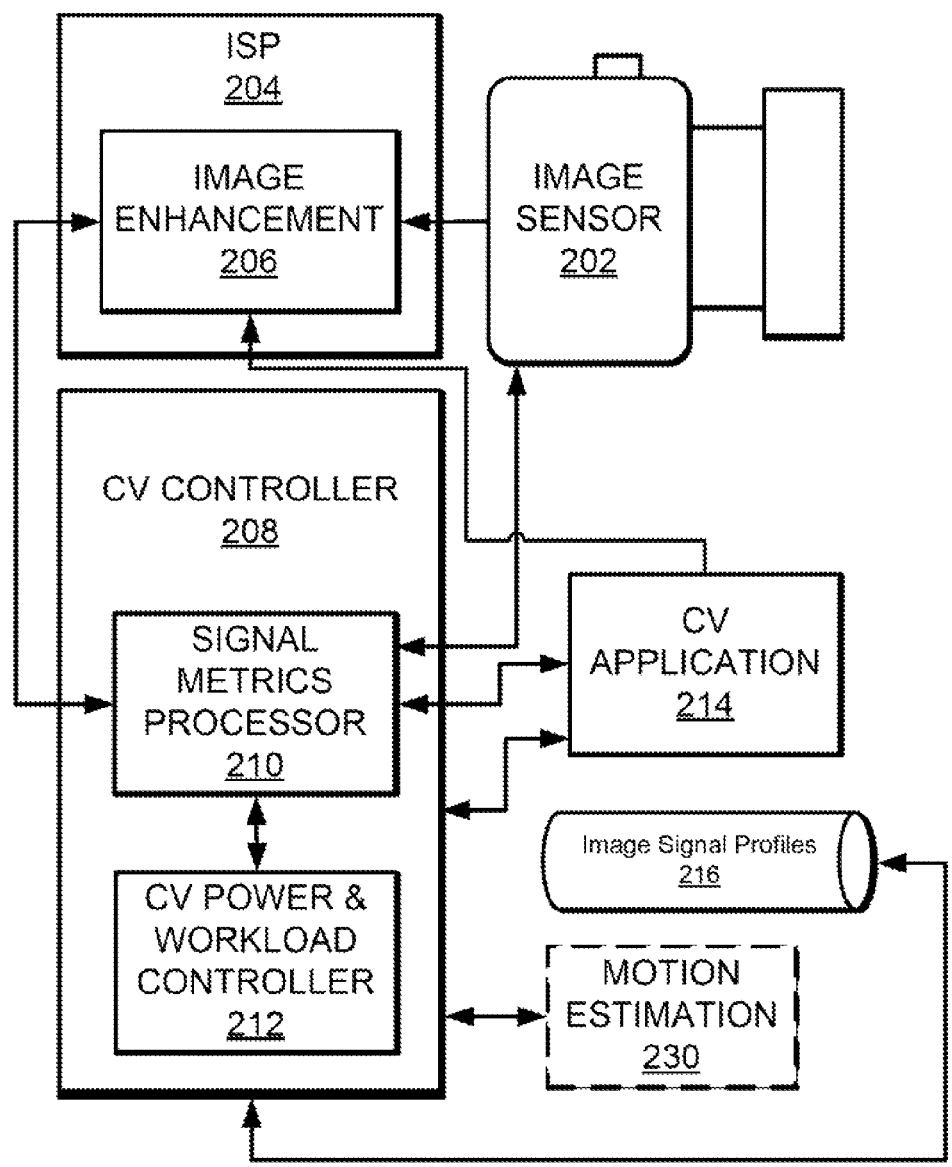
FIG. 2A illustrates an example adaptive computer vision (CV) image pipeline configured with a CV controller to dynamically adapt image quality and power consumption based on a given CV task, in accordance with an embodiment of the present disclosure.

Various embodiments disclosed herein are directed to an adaptive CV image pipeline configured to optimize image quality such that CV tasks can be performed accurately while utilizing a minimum amount of power. FIG. 2A illustrates one such example adaptive CV image pipeline 200A in accordance with an embodiment of the present disclosure. As can be seen, the CV image pipeline 200A includes an image sensor 202, an ISP 204, a CV controller 208, CV application 214, and an optional motion estimation module 230.

Image sensor 202 may be implemented, for example, as any type of sensor capable of capturing light and converting it into a proportional electrical signal. Various types of sensors can be utilized such as CMOS, CCD and hybrid CCD/CMOS. In some cases, image sensor 202 may be configured as a color image sensor such as, for example, a Bayer filter sensor. In other cases, image sensor 202 can be configured to detect various types of image data. Some such examples include, for instance, color image data (RGB), color and depth image data (RGBD camera), depth sensor, stereo camera (L/R RGB), YUV, infrared signals, and x-rays. The image sensor 202 can be configured to measure various image signal characteristics such as, for instance, luminance (brightness), chrominance (color), contrast. Although a single image sensor 202 is depicted in FIG. 2A, it should be appreciated additional sensors and sensor types can be utilized (e.g., multiple cameras arranged to photograph a scene from different perspectives) without departing from the scope of the present disclosure. In an embodiment, image sensor 202 can be virtually any number of image sensors with different configurations. For example, image sensor 202 may include a first sensor being an infrared detector, and a second sensor being a color-image sensor (e.g., RGB, YUV). In other examples, image sensor 202 may include a first sensor configured for capturing an image signal (e.g., color image sensor, depth-enabled image sensing (RGDB), stereo camera (L/R RGB), YUV, infrared, and x-ray) and a second sensor configured to capture image data different from the first image sensor.

ISP 204 may be implemented, for example, as a application-specific standard product (ASSP), or an application-specific integrated circuit (ASIC). In some cases, ISP 204 may be a CV-enabled ISP as discussed further below with reference to FIGS. 2B and 2C. As shown, ISP 204 includes an image enhancement module 206. It should be appreciated that image enhancement module 206 has been simplified for clarity and could include additional modules, such as, color processing modules, compression modules, and other such image enhancement modules. In some cases, image enhancement module 206 comprises a number of independent processors/co-processors for processing an image signal from the image sensor 202. In addition, and in accordance with an embodiment, image enhancement module 206 may comprise a number of conventional post-capture image processing modules (not shown) such as color correction, and image stabilization. In some cases, image enhancement module 206 is capable of digitizing an image signal from image sensor 202 (e.g., analog-to-digital conversion (ADC)). In other cases, additional analog stages, such as dedicated ADC integrated circuits (not shown) may convert raw image signals from image sensor 202 to digital image data. ISP 204 can include any type of memory (e.g., flash, RAM memory) suitable for storage of image data captured by the image sensor 202. In an embodiment, CV controller 208 is configured to control the image sensor 202 and the ISP 204, and enables the CV application 214 to snap a frame for image processing (e.g., a still photo), or in other cases a plurality of frames (e.g., a video or burst-mode).

CV controller 208 may be implemented, for example, as a Complex Instruction Set Computer (CISC) or Reduced Instruction Set Computer (RISC) processors, x86 instruction set processors, multi-core, microcontroller, an ASIC, or central processing unit (CPU). In some embodiments, CV controller 208 may comprise dual-core processor(s), dual-core mobile processor(s), and so on. CV controller 208 can include storage (not shown) such as non-volatile storage devices including flash memory and/or volatile storage devices such as Random Access Memory (RAM), Dynamic Random Access Memory (DRAM), and Static Ram (SRAM). In some embodiments, the CV controller 208 can include instructions that when executed cause a processor, such as the CV controller 208 and/or the processor 810 of computer system 800 (FIG. 8) to carry out a process, such as process 300 described below with respect to FIG. 3.

As shown, CV controller 208 includes a signal metrics processor 210 and a CV power and workload controller 212. In some cases, the signal metrics processor 210 and the CV power and workload controller 212 are integrated in the CV controller 208, such as the embodiment shown in FIG. 2A. In other cases, the signal metrics processor 210 and the CV power and workload controller 212 are implemented as stand-alone modules of the CV image pipeline 200A. As shown, the CV controller 208 can include a plurality of image signal profiles corresponding to each type of CV task the controller 208 can perform image capture for. In an embodiment, these image signal profiles include so-called "best-case" characteristics (metrics) that the CV controller 208 can use to determine if a captured image signal is suitable for the corresponding CV task. In some cases, these best-case image signal profiles can be learned by the CV controller 208, during, for example, a training method whereby image data with optimal characteristics for a given CV task is captured and profiled by the CV controller 208. The training method can be implemented for either on-the-fly or off-line execution according to its complexity and system requirements. In other cases, the CV controller 208 can "learn" or otherwise derive best-case image signal profiles based on the CV controller 208 receiving positive/high confidence score feedback from the CV application 214. As discussed below in more detail, the CV application 214 can communicate such feedback by computing a confidence score relative to the success of a CV task deriving meaningful information from a captured image signal. In an embodiment, the image signal profiles can be stored in relational database (SQL), a flat file, or in RAM of the CV controller 208.

In an embodiment, CV power and workload controller 212 includes a memory (not shown) which is configured with one or more CV task-specific power profiles. For example, CV task-specific power policies may include an estimation of the amount of power (in milliWatts), a particular CV task is expected to consume per frame, per millisecond of operation, or some other suitable period of time. In this example, each task-specific power profile may further identify or otherwise include which post-capture image enhancements of the image enhancement module 206 are included in the estimation. In addition, the task-specific power profiles may further identify or otherwise include a capture mode of the image sensor 202 (e.g., burst, continuous, single-shot) and other configuration included in the estimation (e.g., resolution, and frame rate). In some cases, the these CV task-specific power profiles may be utilized by the CV power and workload controller 212 to insure that power constraints of an electronic device are observed before capturing image data for CV tasks, such as those performed by the CV application 214. In these cases, the CV controller 208 may determine a particular CV task cannot be performed because the performance requirements would exceed, or substantially deplete battery power, for example. In this case, the CV controller 208 can communicate a failure code/reason to the CV application 214 which can detail the particular reason why the CV task/configuration exceeds power constraints. Alternatively, CV controller 208 may suggest an alternative task and/or apply a different capture configuration (e.g., resolution, frame rate, and capture mode) which utilizes less power.

In an embodiment, the CV controller 208 may determine if a particular CV task can be performed based on input data from the motion estimation module 230. In some cases, motion estimation module 230 may be coupled to one or more sensors such as, for example, gyro sensors, accelerometers, and positional sensors. In some cases, if a request to capture image data by the CV application 214 is made while motion estimation module 230 is registering a significant amount of motion, the CV controller 208 can communicate such information to the CV application 214. It should be appreciated that motion can adversely affect image quality due to, for instance, a shaky camera or the motion of a camera mounted on a person/vehicle. To this end, the CV controller 208 can prevent the capture of unsuitable image data by insuring the image sensor 202 is sufficiently still/stable prior to capture. Alternatively, the CV controller 208 can apply a corrective capture configuration to ISP 204 and the image sensor 202. For example, consider if a face recognition task is being performed by the CV application 214 while the electronic device is in motion (e.g., on the lapel of a police officer's uniform during a suspect chase on foot). In this example, a significant amount of motion may impede the successful capture of image data, and by extension, waste power while attempting to capture and process such image data. To this end, the CV controller 208 may detect motion via motion estimation module 230 and apply a corrective configuration to the image sensor 202 and the ISP 204. In the immediate example, a corrective configuration can include, for example, burst-mode capture and/or post-processing enhancements such as image stabilization by the image enhancement module 206. In addition, the CV controller 208 can communicate with the CV application 214 to cause the CV application to utilize specialized routines to compensate for such situations. For example, consider in the context of a facial recognition task, recognition may still be performed accurately if, for instance, image data was captured in a burst-mode by the image sensor 202 and processed by a routine of the CV application 214 to super-resolve faces. In an embodiment, the CV controller 208 may provide cues/instructions to CV application 214 to perform this additional image processing. Although various corrective configurations include examples directed to a facial recognition the present disclosure is not so limited. For example, other motion-sensitive CV tasks (e.g., mobile OCR, object and road sign recognition from a moving vehicle or bicycle, and gesture recognition in outdoor or public settings) can advantageously benefit from the motion detection and correction routines described above.

CV application 214 can be implemented, for example, as a computer program product executed on an electronic device such as a so-called "App." To this end, the CV application 214 may be implemented as a plurality of computer instructions in languages including C, C++ and assembly, for example. In other cases, CV application 214 may be implemented in an intermediate language such as, for example, python, ruby, and java. In various embodiments, CV application 214 may be configured with one or more routines to perform a particular CV task such as, for example, optical character recognition (OCR), gesture recognition, face recognition, and object detection, and visual inspection. In any such embodiments, the CV application may be, for example, an application for use in smartphones (e.g., turn-by-turn directions), automobiles (e.g., backup safety camera), autonomous robots, and wearable computer devices. In an embodiment, CV application 214 includes one or more CV routines which may be utilized to analyze image data to perform various CV tasks (e.g., object detection, gesture recognition, face recognition, and OCR).

In use, CV application 214 requests the CV controller 208 perform capturing of image data based on communicating performance requirements, such as a CV task-type identifier, at an onset of a CV task. As discussed above, the CV controller can determine performance requirements based on a CV task-specific configuration corresponding to the CV task-type identifier received from the CV application 214. Alternatively, or in addition to, the CV task-specific configuration of the CV controller 208, the CV application 214 can provide configuration parameters for image capture for fine-grain control as well as high speed response. It should be apparent in light of this disclosure that the techniques disclosed herein enable a system for image capture and CV processing with a low latency response and with the ability to perform multiple control cycles (iterations) over its primary and secondary control loops. In some cases, this communication is via a communication channel between the CV application 214 and the CV controller 208 (e.g., optical interconnect, physical bus, RF/Wireless interconnects, TCP socket, and carbon nanotube (CNT) interconnects). Provided there is sufficient power to capture the image data utilizing the desired configuration (as determined by the CV power and workload controller 212, for example), the CV controller 208 requests image sensor 202 capture information within its field of view/range of sensitivity. In some cases, information about a scene includes an image signal corresponding to a color signal (e.g., RGB, YUV). In other cases, captured information includes, for example, x-ray, thermal (e.g., infrared), laser (e.g., LIDAR), or other types of image signals representative of an observed scene.

Scene information captured by image sensor 202 can be processed by ISP 204 through image enhancement module 206. Image enhancement module 206 can be configured to digitize image signal information (e.g., with an integrated ADC stage) and perform various post-capture image processing routines. Such image processing routines include, for example, motion compensation, noise filtering, Bayer filtering, image scaling, gamma correction, contrast enhancement, sharpness enhancement, image enhancement, color space conversion (e.g., between formats such RGB, YUV, YCbCr), chroma subsampling, frame rate conversion and image compression/video compression (e.g., JPEG). While the exact post-capture processing algorithms employed by the image enhancement module 206 are not particularly relevant to the present disclosure, it should be appreciated that the image enhancement module 206 may be controlled by, for example, the CV controller 208 to implement on-the-fly configuration changes such that that certain post-processing routines are enabled/disabled depending on a given CV task being performed.

In an embodiment, the signal metrics processor 210 of the CV controller 208 is configured to analyze image data captured by the image sensor 202 to measure various characteristics such as, for example, noise, sharpness, noise, dynamic range, blur, tone reproduction, contrast, color accuracy (color shifts, saturation, and white balance), distortion, artifacts (e.g., due to JPEG compression), and so forth. It should be apparent in light of this disclosure that any other measurable characteristic of an image signal captured by an image sensor is within the scope of the present disclosure. In some cases, measurements are communicated to CV controller 208 as they become available. For example, measurements such as noise and sharpness are usually available from the image sensor 202 nearly instantaneous with captured image data. In another example, some characteristics such as, for example, post-capture processing results (e.g., noise and image stabilization) may not be available until after some processing of raw image data from image sensor 202 has occurred (e.g., via the image enhancement module 206).

In an embodiment, CV controller 208 determines performance requirements based on a request to capture image data by the CV application 214. It should be appreciated that different types of CV tasks require different performance requirements and operate in different modes (e.g., always-on, detection mode, and manual capture). For example, performance requirements for OCR can be different than performance requirements for, for instance, facial recognition and gesture recognition. To this end, the CV controller 208 can configure image capture at an onset of a CV task by receiving a request from the CV application 214 to begin capturing. The request from the CV application 214 can include, for example, an identifier of a particular CV task to be performed. In an embodiment, the CV controller 208 configures image capture in a manner that is optimized for the identified CV task based on a corresponding CV task-specific configuration profile. In some cases, each CV task-specific configuration profile specifies a capture mode (e.g., burst, continuous, single-frame capture) and configuration (e.g., resolution and frame rate) for the image sensor 202 that will result in a captured image signal having desirable characteristics. Likewise, each CV task-specific configuration profile can specify post-processing routines to apply via the ISP 204 such that raw image data is enhanced/processed to the extent necessary for accurate CV analysis (within power constraints, if necessary). In addition, and in accordance with an embodiment, the CV controller 208 can automatically adjust an image capture configuration based on monitoring on-going performance of the CV application 214. In this embodiment, the CV controller 208 is communicatively coupled to the signal metrics processor 210 and configured to measure characteristics (e.g., contrast, noise, sharpness) of an image signal captured by the image sensor 202 and optionally can communicate the same in real-time to a CV application 214. As discussed above, the CV controller 208 enables the CV application 214 to initiate image capture by specifying, among other things, an identifier of a CV task. These instructions to initiate image capture can also enable a bi-directional communication channel between the CV controller 208 and the CV application 214 (e.g., optical interconnect, physical bus, RF/Wireless interconnects, TCP socket, and carbon nanotube (CNT) interconnects). In an embodiment, the CV application 214 can communicate performance indications such as, for example, a confidence/accuracy score to the CV controller. In some cases, the CV controller can utilize positive/high confidence score indications to "learn" best-case image signal characteristics for a given CV task and store them in profiles for subsequent use. In other cases, the best-case image signal characteristics can be predetermined during, for example, manufacture of an electronic device.

In an embodiment, the CV image pipeline 200A can be configured to focus on particular regions of interest (ROI) within an image signal that are salient to a given CV task. In some cases, a ROI may be determined based on a weighting scheme. By way of example, consider the CV application 214 is configured to perform a hand gesture recognition CV task. In this example, pixels having skin (e.g., based on skin color) will be given greater emphasis than pixels without. To this end, the weighting scheme may assign pixels with skin a higher value than those without. In another example, consider that during an OCR task, pixels with high contrast (e.g., defining sharp lines) can be given a weight greater than other pixels without. Moreover, in some cases post-capture enhancement by the ISP 204 may be limited to only those ROI having pixels salient to a particular CV task. To this end, power consumption can be minimized by the CV controller 208 by enabling only certain ROI to be reprocessed (e.g., based on feedback from CV application 214) through the image enhancement module 206. As will be appreciated in light of this disclosure, numerous other weighting schemes may be utilized to assign pixel values and are within the scope of the present disclosure.

Figure 2B:
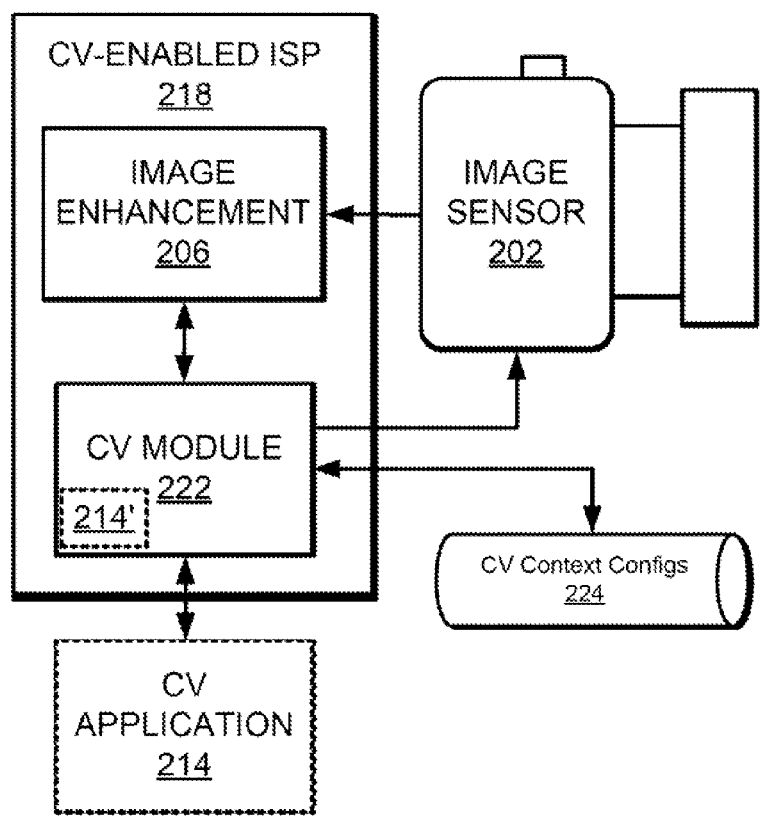
FIG. 2B illustrates an example adaptive CV image pipeline configured for ultra-low power, always-on continuous CV in accordance with another embodiment of the present disclosure

Now referring to FIG. 2B, another example adaptive CV image pipeline 200B is depicted in accordance with an embodiment of the present disclosure. As shown, CV image pipeline 200B includes image sensor 202, a CV-enabled ISP 218, and a CV application 214. In some respects, CV-enabled ISP 218 is similar to ISP 204 of FIG. 3 to the extent that CV-enabled ISP can include a number of post-capture image processing stages within image enhancement module 206, such as color correction, image stabilization, and compression. Likewise, CV-enabled ISP 218 can be implemented in various ways, for example, as a microprocessor, ASIC, FPGA, and SoC. But, as discussed below, the CV-enabled ISP includes aspects which depart from conventional ISPs. In particular, as will be appreciated in light of this disclosure, the CV-enabled ISP 218 includes an integrated CV module 222 that enables ultra-low power, so-called "always-on" functionality within power constrained computing devices.

In an embodiment, the CV module 222 is configured for so-called "always on" functionality. In this embodiment, CV module 222 can perform an initial capturing of image data in an ultra-low power mode such that image data is captured at a minimum frame rate and resolution (e.g., luminance-only images). In addition, and in accordance with an embodiment, a minimum number of image enhancements may be applied via the image enhancement module 206. In some cases, CV module 222 causes the image pipeline 200B to enter a standby/idle mode between low-quality captures such that the image sensor 202, associated circuitry (e.g., one or more analog-to-digital stages) are turned off and draw minimal/zero power. Once captured, low-quality image data can be analyzed to determine if a CV trigger event has occurred. As used herein, a CV trigger is defined as an event that initiates or can otherwise be used to initiate subsequent CV processing and routines as variously disclosed herein. In some cases, a CV trigger event can be, for example, a hand gesture detected in the low-quality image data by the CV module 222. In other cases, a CV trigger event can be a fiducial, or other identifiable object (e.g., at least one of a document, a line, a face, a marker, an image, and a particular color) within the low-quality image data that can be discerned by the CV module 222. In still other cases, a CV trigger event can be a manual event, such as an event triggered by a physical button press, a touch-screen selection, or other input received by an electronic device. In any such cases, a detected event can cause the CV module 222 to execute additional capturing and/or processing of image data and CV-specific routines to be performed as variously described herein.

In an embodiment, a CV trigger event enables the CV image pipeline 200B to capture a subsequent image frame in a medium-quality mode (e.g., medium resolution, chrominance (color)). In some cases, the CV module 222 can analyze the medium-quality data to discern features of an observed scene to classify a scene context. By way of example, consider that a particular scene may include multiple types of features, for example, one or more portraits, text documents, or other identifiable elements. In addition, these features may be depicted within a context such as an outdoor brightly-lit scene. To this end, CV module 222 can classify the elements of a scene to determine CV tasks to be performed based on a detected context. It should be appreciated that CV module 222 is not limited to making just one "hard decision" as to the classification of a scene; rather, CV module 222 can produce a likelihood corresponding to each CV task type. For example, CV module 222 may determine that there is a high likelihood of an OCR task based on a visible sign, as well a low likelihood face recognition task based on detecting the shape/geometries of one or more human faces within the captured data. It should be appreciated that different recognizable features/elements (e.g., a hand, a character, an object, a fiducial) can be associated with one or more tasks, and that this disclosure is not limited in this regard. To this end, CV module 222 can utilize the likelihood scores to order tasks, for instance, in descending order with the highest scoring task first. CV module 222 may then select a context-specific configuration for the highest scoring task from the CV context configuration database 224. It should be appreciated that the context-specific configuration can take into account the context (e.g., brightly-lit outdoor scene, dim indoor scene, etc.) such that image data is captured in a manner that enables CV tasks to be performed (e.g., increasing shutter delay). As will be apparent in light of this disclosure, CV tasks may be executed in parallel and the present disclosure is not limited to sequential processing of CV tasks. In cases, where multiple CV tasks are performed concurrently (in parallel), the configuration of the CV image pipeline is such that image quality is optimized for all CV task-types being executed. In an embodiment, each type of CV task may have two or more corresponding configurations. In these cases, each configuration may correspond to a particular environment in which the task was detected (e.g., an outdoor environment), for example. In other cases, each configuration may correspond to a different power-profile such that a low, medium, or full-rate configuration. In any such cases, and in accordance with an embodiment, each configuration can be context-specific and can include a number of parameters including, for example, low-level feature extraction parameters, ISP configuration parameters, and CV analysis routines specific to a given CV task. In this embodiment, CV task-specific feature extraction parameters can be applied during feature extraction by CV module 222 to convert discernable low-level features into machine-readable symbolic representations. Also in this embodiment, CV module 222 can apply CV task-specific ISP configuration parameters to image sensor 202 and image enhancement module 206 such that image data is captured at a particular resolution and/or frame rate, and that specific post-capture routines are applied to captured image signals. As will be discussed below with reference to the methodologies of FIG. 5, CV module 222 enables continuous capture of image data in an ultra-low power mode while dynamically adjusting configuration of the CV image pipeline 200B to produce image data with image qualities particularly well-suited to performing a given CV task. To this end, the CV module 222 can include instructions that when executed cause a processor to carry out a process, such as process 500 described below with respect to FIG. 5.

In an embodiment, CV module 222 is configured to perform additional CV processing in CV application 214. For example, CV application 214 may be executed by a generic processor (e.g., a CPU) of an electronic device and communicate with CV module 222 via a communication channel (e.g., optical interconnect, physical bus, RF/Wireless interconnects, TCP socket, and carbon nanotube (CNT) interconnects). In this example, routines performed within the CV module 222, as discussed above, can detect a CV event trigger and perform one or more CV tasks to provide information to a high-level process such as CV application 214. In some case, this information can contain, for example, the symbolic representation of low-level features extracted from images (e.g., facial features, segmented characters for OCR, and object geometries). In other cases, this information can include meaningful information derived through CV analysis such as, for example, derived characters and a detected gesture. In any such cases, this information may be utilized by the CV application 214 to perform additional processing such as, for example, looking up an address during turn-by-turn navigation, and matching facial features against images stored in a database. It should be noted that CV application 214 may be integrated within the CV module 222, such as integrated CV application 214' depicted within CV module 222. In some cases, CV application 214' can be plurality of instructions that when executed by CV module 222 perform CV applications such as turn-by-turn navigation, OCR, and facial recognition routines. In other cases, CV application 214' can be dynamically programmed within CV module 222 by CV application 214 during, for example, runtime of the CV application 214. In these cases, CV application 214' can be one or more CV specific functions (e.g., pre-compiled code snippets) uploaded by the CV application 214 which advantageously benefit (e.g., enhanced speed, dedicated processing resources) by being performed on-chip within the CV-enabled ISP.

Figure 2C:
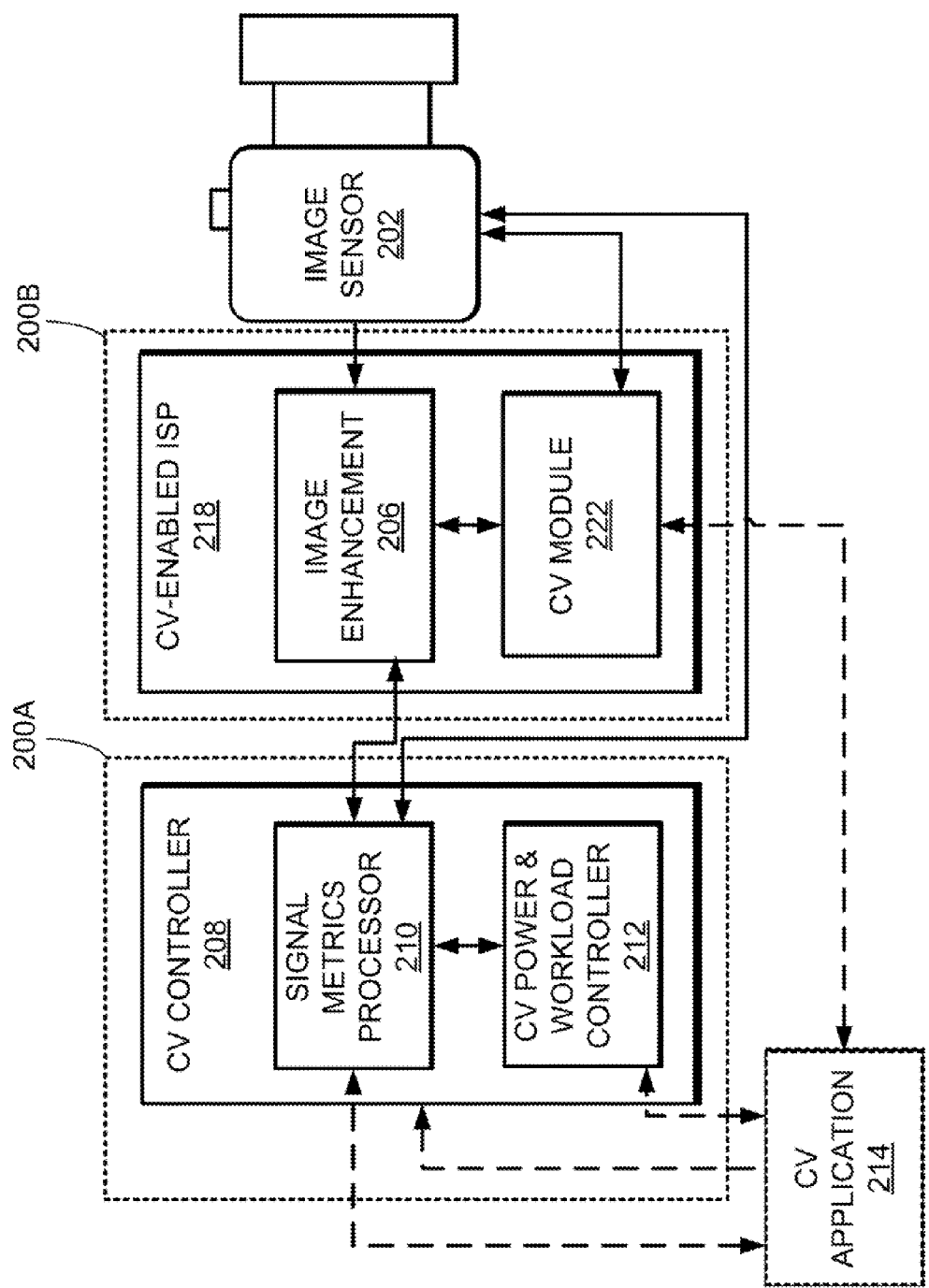
FIG. 2C illustrates an example adaptive CV image pipeline configured with some combined aspects of the adaptive CV image pipelines of FIGS. 2A and 2B, in accordance with another embodiment of the present disclosure.

As will be apparent in light of this disclosure, various alternative embodiments and permutations are within the scope of this disclosure as an image pipeline could be configured with both the CV controller 208 of FIG. 2A and the CV-enabled ISP of FIG. 2B. The embodiment shown in FIG. 2C is one such example. As shown, image sensor 202 is configured to capture an image signal and convert the signal into an electrical signal. Although an analog stage is not depicted in FIG. 2C, one or more analog stages may be utilized to convert the raw image signal to a digital signal. CV-enabled ISP 218 is configured to receive and process the signal via the image enhancement module 206.

In use, image sensor 202 provides an captured image signal in parallel to the image enhancement module 206, the CV module 222, and the signal metrics processor 210. Each of these elements will now be discussed in turn. As discussed above with regard to FIG. 2B, CV module 222 can instruct image sensor 202 to capture low-resolution, low frame rate image data to detect a CV trigger event. Once a CV trigger event has occurred (e.g., a hand gesture or other suitable input), the CV module 222 can capture additional medium-quality image data to classify scene data and determine a CV configuration context to apply. In some cases, ISP and sensor configuration parameters of a particular CV configuration being applied may be adapted to or otherwise used with configuration parameters received from the CV controller 208. In some such cases, the CV controller 208 may determine an image signal is unsuitable for a particular CV task based on, for instance, comparing measured signal qualities against metrics within a best-case image signal profile for a given CV task. In these cases, the CV controller 208 can adjust configuration of the image sensor 202 and the image enhancement module 206 accordingly. This interaction of the CV controller 208 and the CV module 222 may be best understood by way of example. Consider, in one example, a given CV task to be performed by the CV module 222 (or in some cases the CV application 214) is a face recognition task, but the task subsequently fails as no face is discerned within image data (leading to a 0% accuracy/confidence score). In this example, the CV controller 208 may be utilized to determine a potential root cause for the failure by identifying a deficiency in the image signal (e.g., low contrast, and high noise). To this end, the CV controller 208 can adjust the configuration of the image sensor 202 and the image enhancement module 206 to capture new data and/or reprocess previously captured image data with a different configuration. In an embodiment, the CV controller 208 can incrementally adjust settings such that the captured image signal nears characteristics of a best-case image signal profile. In some cases, previously captured image data can be reprocessed through, for example, one or more enhancement routines within the image enhancement module 206 to correct deficiencies. Alternatively, or in addition to reprocessing image data, additional image data may be captured based on the new configuration. In any such cases, and in accordance with an embodiment, the best-case signal profiles can be used to adapt or otherwise used with the ISP configuration parameters being applied by the CV module 222. In this manner, an image pipeline, and more specific to this example the CV-enabled ISP 218, can be configured to apply additional post-capture enhancements to mitigate signal deficiencies prior to image processing by the CV module 222. In addition, certain power constraints observed by the CV power and workload controller 212 may effect incremental changes. For example, if the CV module 222 determines that a facial recognition task is to be performed, the parameters of the selected CV context configuration may be adjusted based on adaptions by the CV controller 208 to comport with power constraints. For example, consider a scenario in which the CV module 222 has determined a plurality of CV tasks to perform in support of, for instance, a turn-by-turn navigational computer program implemented in CV application 214. In this example, an electronic device may lack the necessary amount of battery power to perform a full suite of full-rate CV tasks such as landmark identification (e.g., buildings, statutes, or other identifiable features of a scene) and OCR (e.g., road signs, signage on buildings). To this end, the CV power and workload controller 212 may enforce power constraints such that certain CV tasks are not performed by the CV module 222, or in other cases, performed with configurations which consume the least amount of power. So, in some cases the CV controller 208 can complement the processes of the CV module 222 to mitigate deficiencies in the image signal and optionally enforce power constraints within a resource-constrained device. Similarly, the CV module 222 can complement various processes of the CV controller 208 by enabling so-called "always-on" functionality utilizing low-level CV event detection and context-aware processing.

In an embodiment, elements of the CV image pipelines 200A-C can be implemented within, for example, one or more digital signal processors (DSPs), field programmable gate arrays (FPGAs), fixed-function application-specific integrated circuits (ASICs), or in some cases analog circuits. To this end, while some elements of the image pipeline are depicted within FIG. 2a-2c as stand-alone chips/modules, they can be implemented in, for example, a single system on chip (SoC) or processor, or in any other appropriate combination of hardware and/or software depending on device constraints, the particular CV application and physical form factor of the electronic device. A specific example of an electronic device that can implement the adaptive CV image pipeline techniques variously disclosed herein is computer system 800 of FIG. 8, which will be discussed in turn.

As described above, CV image pipelines 200A-C may be embodied in varying physical styles or form factors. In some embodiments, for example, the CV image pipelines 200A-C, or portions thereof, may be implemented as a mobile computing device having wireless capabilities. A mobile computing device may refer to any device having a processing system and a mobile power source or supply, such as one or more batteries, for instance. As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television smart device (e.g., smart phone, smart tablet, or smart television), mobile internet device (MID), messaging device, data communication device, and so on.

Examples of a mobile computing device also may include computers that are designed to be worn by a person, such as a wrist computer, finger computer, smart glasses, smart bracelets, smart fitness bands, ring computer, neck-pendant computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this regard.

The CV image pipelines 200A-C may include one or more logical or physical channels to communicate information. The information may include sensor data (e.g., image sensor data, gyro sensor data, or any other information output from a sensor or derived from output of a sensor) and control information. For example, an embodiment can include positional information from a gyro sensor. Control information can be used to route sensor data through a system, execute sensor functions (e.g., snap a picture), or instruct a module to process sensor data in a predetermined manner (e.g., causing post-capture image processing algorithms to manipulate image data). The embodiments, however, need not be limited to the elements or context shown or described in FIGS. 2A-2C, as will be appreciated.

Methodology

Figure 3:
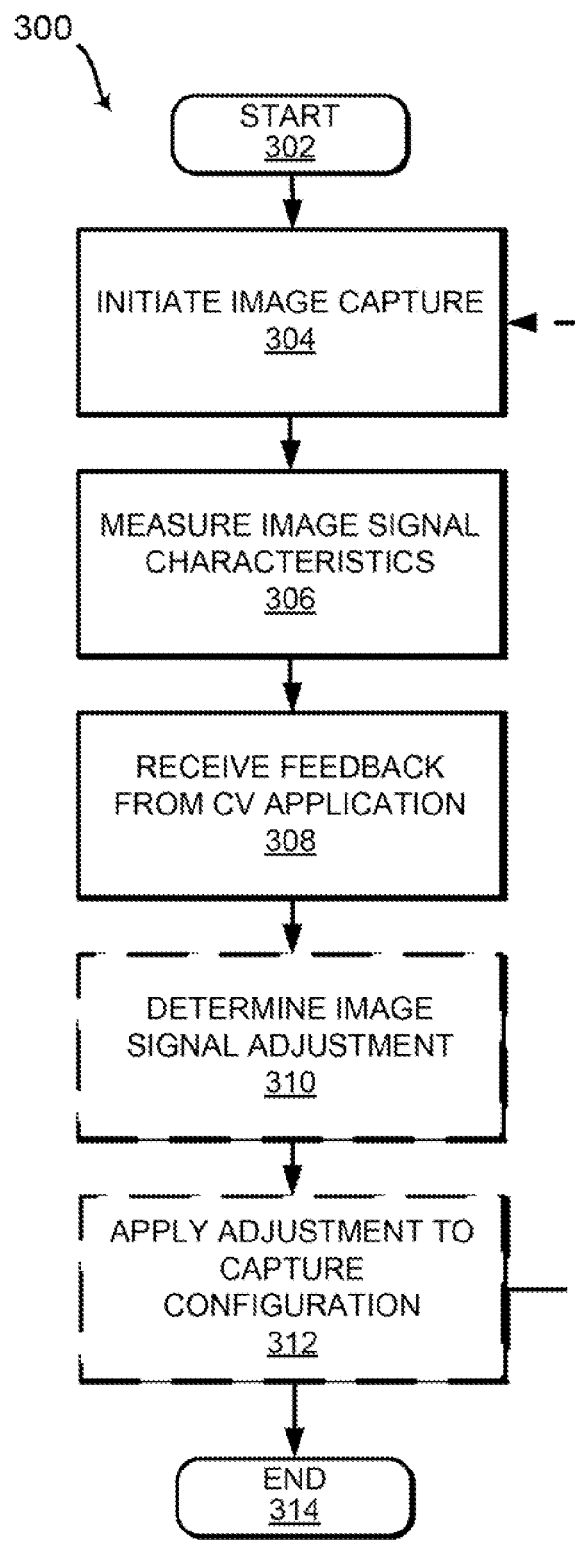
FIG. 3 illustrates a methodology for measuring characteristics of an image signal utilizing a signal metrics processor to determine suitability of the same for performing a CV task, in accordance with an embodiment of the present disclosure.

FIG. 3, with further reference to FIG. 2A, illustrates a methodology for adaptive configuration of a CV image pipeline in accordance with an embodiment of the present disclosure. Method 300 includes acts of initiating image capture, measuring image signal characteristics, receiving performance feedback from a CV application, optionally determining an image signal adjustment, and optionally applying the adjustment to the image pipeline. Method 300 beings in act 302.

In act 304, a request to capture one or more images is received by the CV controller 208 from the CV application 214. In an embodiment, the request comprises an identifier of a particular CV task. In this embodiment, the CV controller determines performance requirements for the identified task based on a CV task-specific configuration. Some such performance requirements may include, for example, resolution, frame rate and other configuration parameters. In an embodiment, the request to capture one or more images is communicated to multiple image sensors. In some cases, each image sensor may be configured to capture a different type of energy (e.g., x-ray, color images, depth-enabled images, and stereo images). In other cases, each image sensor is configured to capture a different perspective of the same scene (e.g., for depth information). In still other cases, each image sensor may be associated but only to the extent that they capture different angles of a scene (e.g., a front and back camera of a smart phone).

In an embodiment, a power policy may be observed by the CV power and workload controller 212. In this embodiment, the CV controller 208 can determine that a particular request to capture image data by the CV application 214 cannot be serviced without exceeding, or substantially depleting available device power. For example, a device operating with a limited amount of battery (e.g., a constrained computing device) may impose a power utilization policy favoring the least amount of processing to accomplish CV tasks. In this example, the CV power and workload controller 212 retrieves one or more CV task-specific power profiles from a memory and determines if the task can be performed. In some cases, CV tasks can be power-hungry, such as OCR which typically requires high-resolution images and consumes a large amount of power (e.g., hundreds of milli-Watts). To this end, the CV power and workload controller 212 may determine that such a CV task would deplete/exceed the available power. In other examples, the device may have ample power available to perform CV tasks but is configured to utilize a minimum amount of power to prolong battery life. In these examples, the CV power and workload controller 212 may retrieve a plurality of CV task-specific power profiles corresponding to low, medium, and high power configurations for a particular CV task. Such a range of profiles may be used to govern the adjustments made to an image signal in accordance with act 310 discussed below. For instance, if a medium-power configuration is selected for a given CV task, the CV controller 208 may observe an enforced power policy by limiting the resolution and frame rate to a particular maximum as defined by the medium-power profile. In addition, other limits may be imposed by a CV task-specific power profile such as the number and/or type of post-capture processing routines that can be applied via the image enhancement module 206, for example. In some cases, the CV power and workload controller 212 defaults to the high-power (also known as full-rate) configuration while power is abundant. In other cases, the CV power and workload controller 212 defaults to medium or low-power configuration if battery power reaches, for example, a threshold percentage (e.g., 10% power, 25%, 50%, and so forth).

In an embodiment, sensor input may be utilized by CV controller 208 when servicing a request to capture image data. Such motion sensors can collect real time data on absolute/relative position and rate of motion (linear and angular). This information is useful to know the context in which images are being captured, and to decide on capture parameters. In contrast, motion estimation includes video (multi-image) processing, whereby an algorithm can compute and assign motion vectors to pixels and/or objects in a scene. In this embodiment, one or more motion sensors (e.g., accelerometers and gyro sensors) may be communicatively coupled to motion estimation module 230. In some cases, the motion estimation module 230 can be configured to provide, for example, whether motion is occurring (e.g., the electronic device is moving) and an estimation of how fast the device is moving (as relatively low speed may create negligible image signal deficiencies). In other cases, the motion estimation module 230 may be configured to detect whether acceleration is increasing or decreasing. In still other cases, motion estimation module 230 can be configured to determine at what angle the image sensor 202 is pointed. In any such cases, the positional/acceleration information may be utilized by the CV controller 208 to avoid capturing unsuitable image data. In an embodiment, the CV controller 208 applies a corrective configuration such that motion is compensated for based on a capture mode of the image sensor 202 and/or application of post-capture routines by the ISP 204. In another embodiment, the CV application 214 may display message to an end-user suggesting that additional lighting is necessary, or other suggestions such as pointing the electronic device at a different angle, and centering an object beneath an image sensor for a better view. It should be appreciated that both data from motion sensors and motion estimation can be utilized in embodiments variously disclosed herein a complimentary fashion. In these embodiments, this complimentary nature enables sophisticated image processing leading to improved computer vision performance. For example, if blur is caused by camera motion, a corrective configuration may be related to image capture (image sensor) settings (e.g., shorter exposure if there is enough light). Conversely, and in accordance with an embodiment, if motion estimation indicates very slow or otherwise no motion of the object of interest, frame rate can be reduced to save power.

In act 306, an image signal captured by the image sensor 202 is measured by the signal metrics processor 210. In an embodiment, measured signal characteristics can include, for example, noise, sharpness, and contrast. In another embodiment, measured signal characteristics can include other measurable qualities such as, for example, blur, tone reproduction, contrast, color accuracy (color shifts, saturation, and white balance), distortion, artifacts (e.g., due to JPEG compression), and so forth. In some cases, certain signal characteristics are immediately available such as noise and sharpness. In other cases, some signal characteristics are not available until after post-capture processing (e.g., detecting artifacts after compression).

Figure 4:
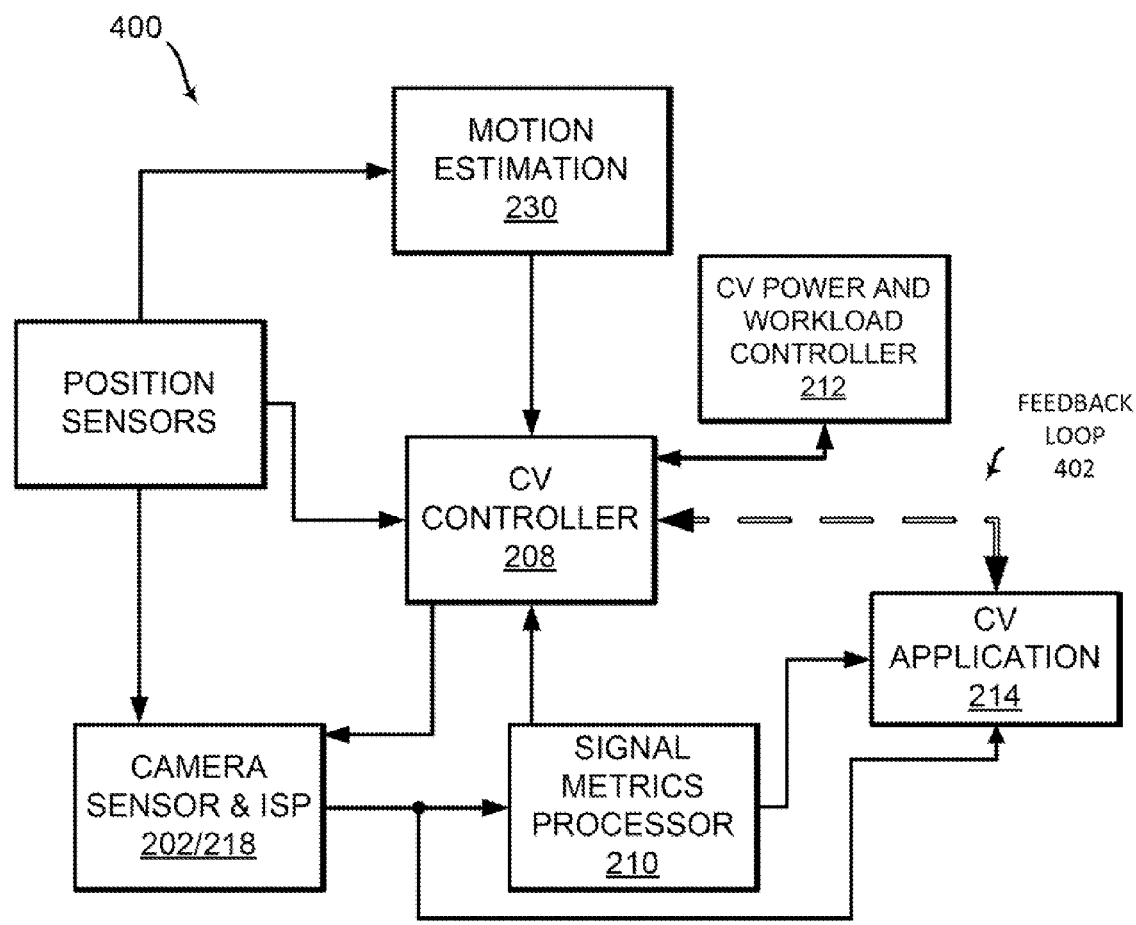
FIG. 4 illustrates a process flow of an example image pipeline including an adaptive feedback loop, in accordance with an embodiment of the present disclosure.

In act 308, the CV controller 208 receives feedback from the CV application 214 including a performance indicator for a given CV task. In an embodiment, the performance indicator can include a confidence score relative to the success of a given CV task deriving meaningful information from the captured image data. Such feedback forms essentially a feedback loop between the CV controller 208 and the CV application 214 such that CV controller 208 can dynamically adjust image capture to improve CV processing. Referring now to FIG. 4, the process flow 400 of one such example feedback loop is illustrated. For the purpose of clarity, data flow 400 has been simplified to include a subset of components and should not be construed as limiting. As shown, adaptive feedback loop 402 is configured between the CV controller 208 and the CV application 214. As image capture occurs, CV controller 208 receives feedback from the CV application 214 during CV processing (e.g., a confidence score). To this end, the CV controller 208 can adjust image capture based on this feedback. In some cases, the CV controller 208 makes such adjustments based on, for example, motion estimation (via the motion estimation module 230) and power constraints (enforced by the CV power and workload controller 212).

Returning back to FIG. 3, and in particular act 310, the CV controller 208 may optionally determine an image signal adjustment based on information received from the image feedback loop 402 (e.g., a confidence score). In some cases, the CV controller 208 retrieves a best-case image signal profile from the image signal profiles database 216 that corresponds to a particular CV task being performed. In an embodiment, the CV controller 208 uses a low confidence score (e.g., as a result of a CV task failing) in combination with metrics from the best-case image signal profile to determine a root cause for the poor CV performance such as, for example, an image signal deficiency (e.g., too much noise and/or low sharpness). In embodiment, the CV controller 208 can determine that characteristics of a captured image signal are within tolerances as defined by the metrics within the best-case image signal profile. As previously discussed, best-case signal profiles represent prior image signals that resulted in a high confidence score detected by the CV controller 208. Note, however, that such best-case signal profiles could be derived in different ways (e.g., through training methods, theoretically, and/or empirically) and that this disclosure is not limited in this regard. In some cases, these best-case image signal profiles can be utilized as benchmarks to determine image data suitability. For example, if each measured characteristic of a captured image signal is within a threshold percent (e.g., 1%, 10%, 20%, and so on) of metrics within a best-case image signal profile, the captured image signal may be considered suitable for a particular CV task. In such instances, motion estimation may provide the CV controller 208 with clues or inferences as to why CV performance is failing/under-performing. Conversely, if a measured characteristic of a captured image exceeds a threshold percentage of the metrics within a best-case image signal profile, the CV controller 208 can adjust the capture configuration accordingly. More specifically, the CV controller 208 can apply a corrective capture configuration such that previously captured image data is reprocessed through ISP 204 (e.g., to filter noise, to perform image stabilization, or other appropriate image processing routine). Alternatively, or in addition to reprocessing image data, the CV controller 208 can adjust the capture mode (e.g., burst, single-shot, continuous) and configuration of the image sensor 202 (e.g., resolution, frame rate, shutter delay, and contrast).

In act 312, an adjustment may be optionally applied to a capture configuration based on the CV controller 208 determining such an adjustment is necessary (e.g., based on captured image characteristics not being with tolerance). In an embodiment, the adjustment determined in act 312 is an incremental adjustment of a particular image characteristic (e.g., 1%, 5%, 10%, and so on). For example, if measured contrast is 20% below a corresponding metric in a best-case image signal profile for the given CV task, an incremental adjustment of some degree may be applied to correct the deficiency. In this example, the degree of adjustment is governed by multiple factors such as, for example, available power, the degree of the deficiency (e.g., how far off from the metric) and how the adjustment will be applied. For example, in some cases, an adjustment to a configuration of the ISP may be applied and previously captured image data may be reprocessed with the new configuration. In this case, an adjustment to a particular characteristic of the image data may be aggressive to insure that reprocessed image data is suitable for CV processing. In other cases, a device may not have sufficient power to aggressively adjust certain characteristics, such as resolution, and thus can take a gradual approach. In an optional embodiment, after an adjustment is made to the capture configuration, the method returns to act 304 to capture additional image data with new configuration.

In an embodiment, the CV controller 208 may apply new performance requirements to only regions of image data salient to a particular CV task. For example, only pixels which include skin may be reprocessed via the ISP 204 with the new configuration parameters. In other examples, a different weighting scheme may be used to determine salient regions of a captured image signal. It should be appreciated that by limiting post-processing of image data to a ROI can substantially minimize power consumption as well as other resources of a device (e.g., CPU, memory, and so forth) during CV processing. The method ends in act 314.

Figure 5:
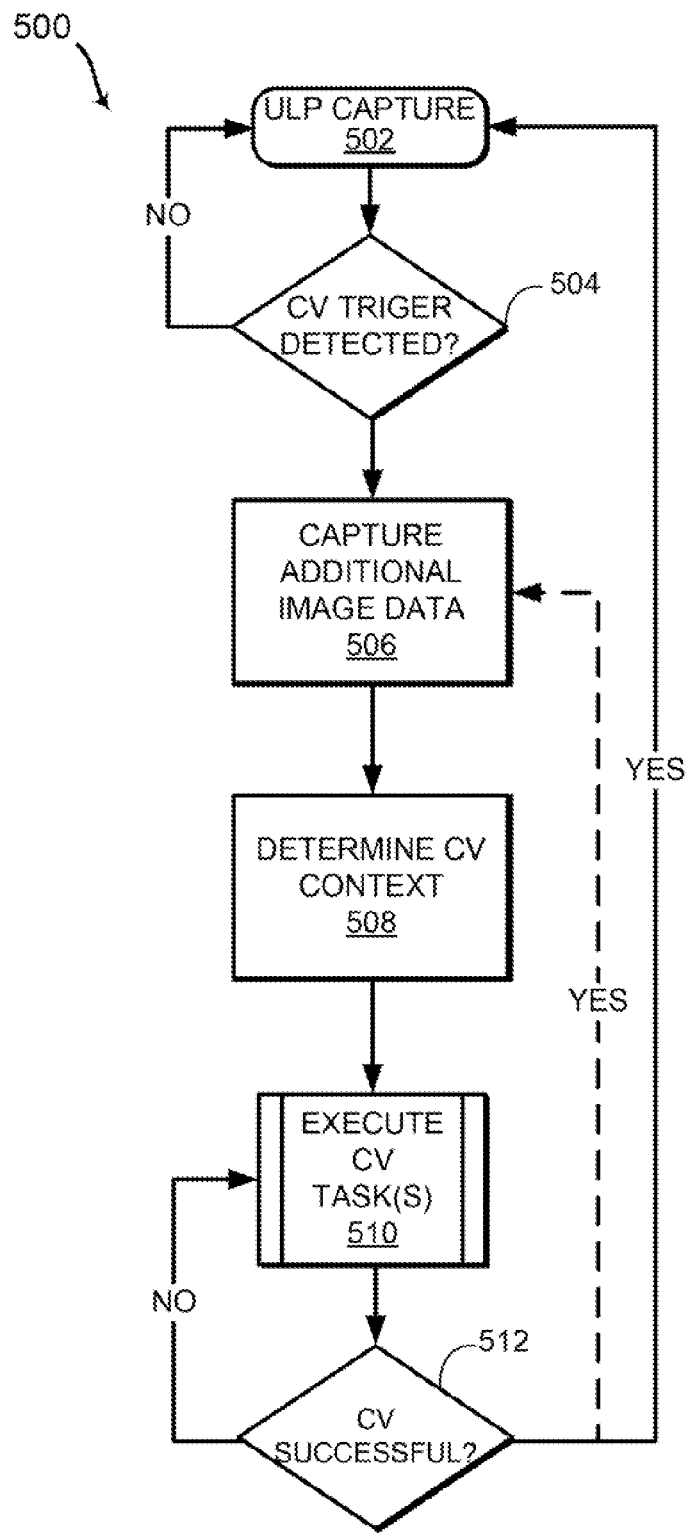
FIG. 5 illustrates a methodology for an ultra-low power, always-on capture mode for continuous CV, in accordance with an embodiment of the present disclosure.

Now referring to FIG. 5, with further reference to FIG. 2B, a methodology for ultra-low power, always-on capture mode for continuous CV is depicted in accordance with an embodiment of the present disclosure. Method 500 includes acts of ultra-low power capture, detecting a CV trigger event, capturing additional image data, classifying a scene, and executing one or more CV tasks based on captured image data. Method 400 begins in act 502.

In act 502, image sensor 202 is configured in an ultra-low power mode and captures scene data within view. In an embodiment, the ultra-low power mode includes the image sensor 202 capturing very low-resolution, luminance-only images with a minimal amount of post-capture image processing applied. In some cases, an ultra-low power mode includes the sensor 202 being an inexpensive low-power sensor configured in such a low-resolution, low frame rate mode. In other cases, the image sensor 202 is a full-featured (high-end) image sensor configured in such a low-res, low-quality mode. To this end, the present disclosure is not limited as to what type of sensor is utilized to do the initial capture in a low-power manner.

In act 504, the low-quality image data is analyzed via a processor, such as the CV module 222, to detect if a CV trigger event has occurred. In some cases, a CV trigger event may be a significant change in the incident light pattern (e.g., light to dark, or vice-versa). One example of such a casual event includes a hand being waved in front of the image sensor 202. In other cases, a CV trigger event can be a manual event, such as an event triggered by a physical button press, a touch-screen selection, or other user-input received by an electronic device. In any such cases, a low-complexity algorithm of the CV module 222 can determine the CV trigger event occurred. If no CV trigger event is detected, the method returns to 502. In some cases, the image pipeline (e.g., the CV-enabled ISP 218 and image sensor 202) may enter a standby/idle mode for a predetermined amount of time prior to returning to act 502.

In act 506, additional image data is captured. In an embodiment, additional image data is captured with, for example, medium quality settings such that the image sensor produces images of medium resolution and utilizes a number of post-processing routines via the image enhancement module 206 such that medium quality data is output. Note that medium quality, as generally used herein, is relative to maximum performance capabilities of the image sensor 202 and the image enhancement module 206. To this end, medium quality can denote image quality which is substantially better than the ultra-low power image data which was used to detect the CV trigger event, but still significantly under the maximum quality the image sensor 202 is capable of. In an embodiment, medium-quality image data includes both luminance and chrominance (color) information.

In act 508, the CV module 222 processes the medium-quality image data to determine a CV context. In an embodiment, the CV module 222 utilizes a routine which processes the medium-quality data to classify the content of a scene to determine one or more CV tasks to perform. For example, the CV module 222 may determine that one or more documents are depicted in a scene, faces, and/or other objects are depicted. Note that in each of the preceding examples, shape geometries play a role in detecting CV tasks. However, in other examples, colors (chrominance) and other measurable pixel qualities may be a factor as well. For example, skin color within pixels may be utilized to detect a hand gesture being performed. Likewise, some low level OCR tasks can utilize color and luma statistics to recognize patterns of discrete values within an otherwise random signal. To this end, the CV module 222 may classify a scene based on the likelihood one or more CV tasks will discern meaningful information. In an embodiment, the CV tasks with the highest likelihood are performed first. In other embodiments, the ordering of the tasks are based on, for example, power constraints such as those imposed by the CV power and workload controller 212 (FIGS. 2A and 2C). It should be recognized that in some embodiments CV tasks may be performed in parallel, for instance in a multi-processor device. In an embodiment, the CV module 222 can select a corresponding context configuration from the CV context configuration database 224. As discussed above with regard to FIG. 2B, each type of CV task to be performed may have one or more corresponding CV context configurations. To this end, the CV configuration chosen by the CV module 222 may be based on factors such as selecting a configuration that will utilize a minimum amount of power, and/or a configuration that takes into account the larger context such as if the scene depicted is an outdoor scene, an indoor scene, and so on. Once a particular CV context configuration has been selected, the CV module 222 then continues to act 510.

In act 510, a CV task is executed on the image data based on the CV context configuration selected in act 508. In an embodiment, the CV context configuration includes configuration parameters for ISP 218 and image sensor 202, as well as and an identifier of one or more CV task-specific low-level feature extraction parameters and processing routines. In this embodiment, the configurations applied to the ISP 218 and the image sensor 202 are such that image data is captured in a particular resolution/frame rate and processed by the image enhancement module 206 in a manner that is optimized to a particular CV task being performed. Once captured, low-level task-specific feature extraction can occur to convert image data into symbolic representations. Likewise, task-specific analysis routines may then be applied to convert the symbolic representations into meaningful data. Such task-specific feature extraction/analysis is discussed further below with regard to the methodologies of FIG. 6. In some cases, if the CV task is successfully performed (e.g., meaningful data is derived), the method returns to act 502. As discussed above, before returning to act 502, the image pipeline may enter a standby/sleep mode for a predetermined amount of time to conserve power. Optionally, in accordance with an embodiment, the method 500 returns to act 506 and continues to capture and process image data based on the CV task and CV context configuration determined in act 508. In this embodiment, the method 500 continues to perform CV analysis on subsequently captured image data until no CV context can be determined in act 508 and/or no meaningful information is derived from captured image data in act 510. In one embodiment, each time image data is analyzed in act 508, a different type of CV may subsequently be performed based on derived features (e.g., text document, faces, and other identifiable features). As discussed above with regard to FIG. 2B, CV tasks can be ordered based on a weighting or computed priority (e.g., based on power constraints). Some CV tasks require a capture configuration that utilizes medium-quality data (e.g., hand-gesture recognition) while other CV tasks require a capture configuration that requires high-quality data (e.g., OCR). To this end, each time method 500 returns to act 506, capture configuration will be adjusted based on the highest priority CV task. As will be discussed below with regard to FIG. 7, CV context classification routines of act 508 may be executed in parallel to image data processed in act 510. Once method 500 no longer determines a CV context in act 508 and/or no meaningful information is derived from the captured image data in act 510, method 500 returns to the ultra-low power capturing 502. As discussed above, the method 500 may cause the image pipeline to go into a sleep/standby mode for a predetermined period of time before capturing additional low-quality data. So, although method 500 illustrates a linear process by which image data is captured, classified, and processed according to a CV context configuration, it should be appreciated that certain embodiments of the present disclosure include parallel processing of image data to enable context-aware image in an ultra-low power, always-on image processing mode.

Figure 6:
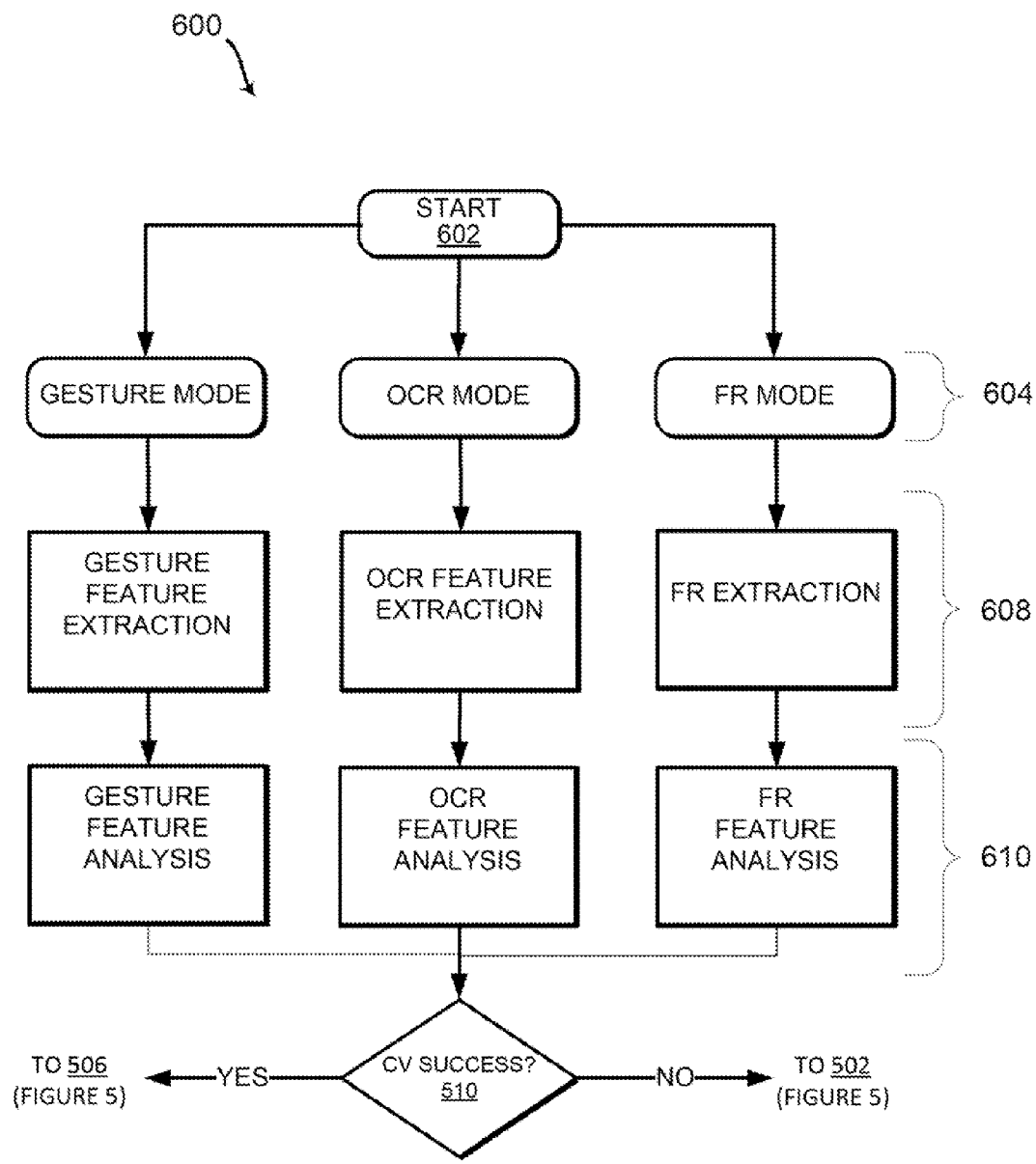
FIG. 6 illustrates a process flow configured to perform CV low-level feature extraction and task-specific processing, in accordance with an embodiment of the present disclosure.

As discussed above with regard to act 510 of FIG. 5, processing of image data can be performed in a CV task-specific manner based on determining a particular CV task and CV context configuration. FIG. 6 illustrates one such example process 600 configured to perform the CV task-specific processing. The method 600 begins in act 602.

In act 602, the CV module 222 determines a CV mode to execute based on the CV context configuration selected in act 508 of FIG. 5. As shown, the CV task modes in act 604 include a gesture mode, an OCR mode, and a face recognition mode (FR). It should be appreciated that other modes could be implemented, for instance object recognition mode, and that the present disclosure is not so limited. In act 608, the selected CV context configuration is utilized by the CV module 222 to select a specific set of feature extraction routines to convert image data into symbolic representations. In some cases, the CV context configuration includes one or more identifiers which can be, for example, references to routines pre-compiled into the CV module 222. To this end, the feature extraction routines may be included in a library of potential algorithms available within the CV module 222. Once CV task-specific feature extraction has been performed in act 608, the method continues to act 610. In act 610, the method 600 performs CV analysis of the symbolic representations generated in act 608 based on the CV task-specific analysis routines. For instance, in act 610 during an OCR task, the symbolic representations derived in act 608 can be analyzed to recognize one or more characters. In some cases, these generated characters may then be output to a display of the device. In other cases, the one or more characters may be further processed by a high-level application such as the CV application 214. In these cases, a process such as, for example, a screen capture program may utilize the detected characters to capture pertinent text from a displayed application or a web page. It should be noted that CV module 222 is not limited to executing one particular action, or set of actions based on deriving meaningful information from an image signal; rather, it should be appreciated that the CV module 222 insures that image capture is configured to properly capture image data for a given task. To this end, the CV module 222 can provide a notification that a task/subtask is being performed, or has been performed (e.g., such as a hand gesture), and that meaningful information has been derived therefrom. Such notification can be received by, for example, the CV application 214 or other application configured to receive and process such CV-events. In any such cases, it should be recognized that the CV module 222 can be dedicated to context selection, task identification, and low-level processing with further processing being left to a high level application. It should be further appreciated that the output of act 610 can be utilized in numerous ways depending on the particular capture mode and a desired configuration. For example, consider a gesture is recognized during a gesture recognition mode. In this example, the registered gesture may be utilized to activate another program on a computer device. For instance, a recognized gesture could cause an event to trigger additional processing of image data by a computer software program, such as CV application 214 of FIG. 2A. If a CV task fails to discern meaningful information or otherwise ended, the method continues to act 502 (FIG. 5) to capture image data in an ultra-low power mode. If the CV task succeeds, the process 600 continues to act 506 (FIG. 5) to capture data. It should be appreciated that, optionally, method 600 can be executed multiple times on captured image data if, for example, act 508 determined that multiple CV tasks were possible based on a detected CV context.

Figure 7:
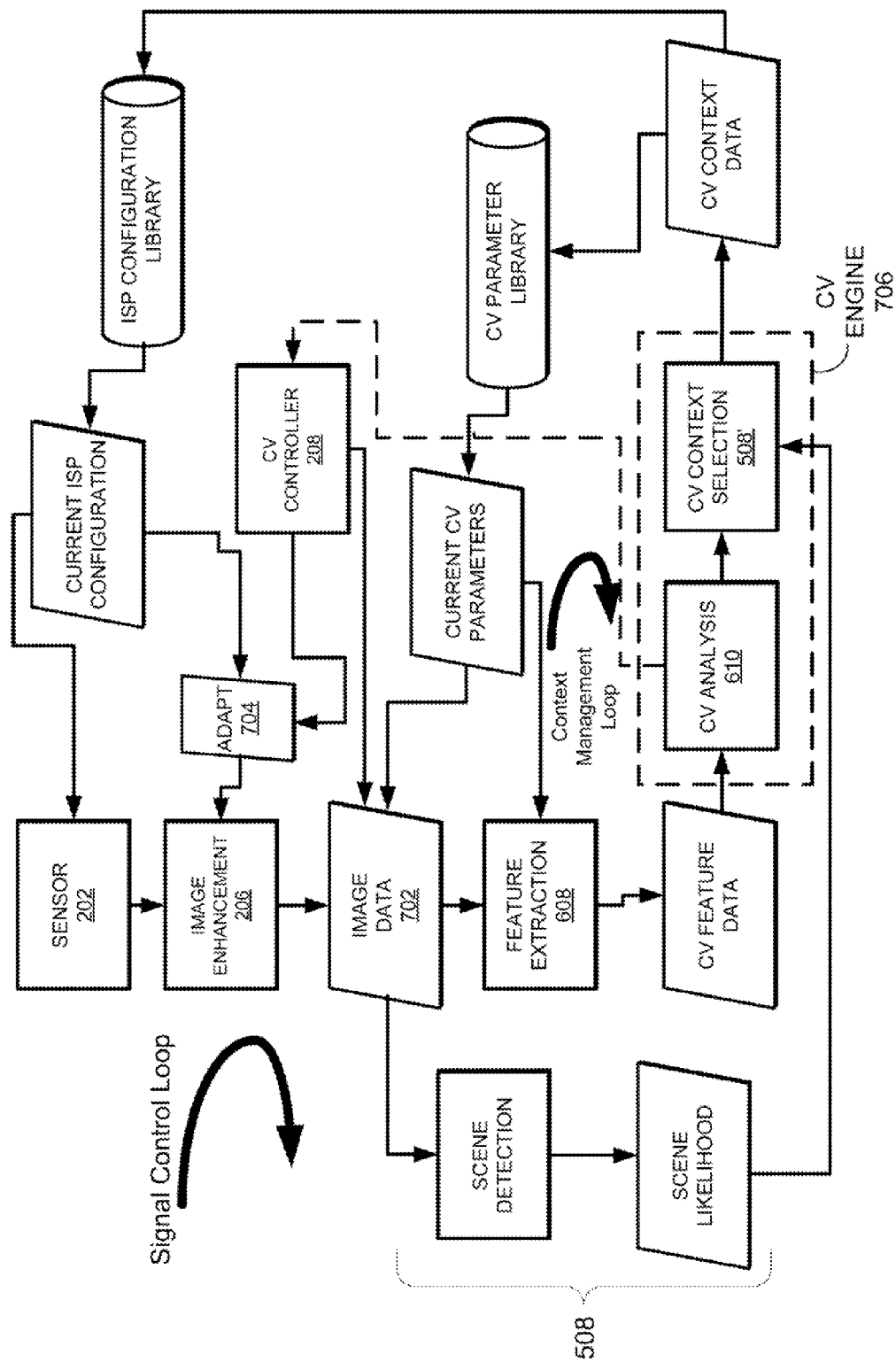
FIG. 7 illustrates a process flow depicting image signal measuring and CV task-specific configuration aspects of the methodology of FIG. 3 in conjunction with aspects of the always-on, ultra-low power capture methodology of FIG. 5, in accordance with another example embodiment of the present disclosure.

Now referring to FIG. 7, a process flow is illustrated including aspects and embodiments of the signal measurement and configuration adapting aspects and embodiments of process 300 in conjunction with aspects and embodiments of the always-on, ultra-low capture modes of process 500. As shown, image data from image sensor 202 is processed by image enhancement module 206. Processed image data 702 is then processed in parallel by act 508 of FIG. 5 and act 608 of FIG. 6. As will be appreciated in light of this disclosure, a low-level signal control loop (or primary control loop) is formed such that image signal quality is measured via CV controller 208 and continuously monitored and adapted to meet the ongoing needs of CV processes. Likewise, it should be noted that a high level control loop (or secondary control loop) is formed that leverages such low-level signal processing of the primary control loop to manage CV context selection and other high-level CV tasks such as CV task-specific configurations and processing of acts 610 and 508'. Thus it would be accurate to describe these control loops as essentially a hierarchal control system whereby the lower level control loop governs signal processing and sensor settings, and the high level control loop governs context management.

As discussed above with regard to FIG. 6, scene data may be classified to determine a particular CV task and CV context configuration, and such determination can be made in parallel to feature extraction routines applied in act 608. As shown, CV context selection 508' is the final part of act 508 after image data 702 is processed in parallel to determine a context. In some cases, feature extraction 608 may not be performed until a context is determined by act 508. In some cases, the parallel classification of scene data in 508 can be utilized to select additional CV tasks (or subtasks) to perform. For example, if an OCR task is presently being performed in act 608 but the field of view no longer contains recognizable character data (e.g., a sign passes from view of a wearable camera), a new CV context may be determined in act 508. In this example, a new CV task may be determined based on, for example, a face, an object, and/or a recognizable element found within a subsequently captured image frame. In any such examples, CV analysis 610 and CV context selection 508' comprise CV engine 706. CV engine 706 enables a determined context to be utilized to adjust image sensor settings and image processing to the extent necessary to insure subsequently captured image data is appropriate for whatever CV task is selected. In the event no additional CV task is determined in act 508, an image pipeline can be optionally put into a standby/sleep mode and then, in some cases, return to the ultra-low power capture mode of act 502.

Still referring to FIG. 7, once a CV task and corresponding CV context configuration has been selected in act 508, subsequent image frames may be processed accordingly. For example and as shown, selection of a particular CV context configuration 508 includes accessing a CV parameter library and ISP configuration library. In regard to the CV parameter library, one or more CV task-specific low-level feature extraction parameters and processing routines may be selected and applied thereby causing feature extraction 608 and CV analysis 610, to process image data accordingly. In regard to the ISP configuration library, one or more post-processing routines may be selected (while others are disabled) thereby causing image enhancement module 206 to process image data accordingly. Also shown, CV controller 208 can be utilized to determine if an image signal is suitable for the CV task selected in act 508. As discussed above with regard to FIG. 2C, CV controller 208 can adapt or otherwise be used with ISP configuration parameters of a selected CV context configuration. In some cases, these ISP configuration parameters may be adapted to comport with power constraints enforced by the CV power and workload controller 212. In other cases, these ISP configurations may be adapted in 704 to insure that CV tasks will be successfully performed on the image data. For example, in some cases, it may be necessary for the CV controller 208 to configure image enhancement module 206 to utilize image stabilization (e.g., because of too much motion registered by motion estimation module 230), or other post-capture image processing routines to account for measured deficiencies in the image data. Although not shown, CV controller 208 can also adjust the configuration of the image sensor to account for measured deficiencies in the image signal. Such configuration changes can include, for example, capturing images in a burst-mode, extending/reducing shutter delay, enabling a flash, or any other appropriate configuration change. It should be appreciated that, as indicated by the broken line from CV analysis 610 to CV controller 208, a failure by CV analysis 610 to derive meaningful information may cause additional requirements to be communicated to the CV controller 208 such that additional action is taken to retry CV analysis including, for instance, re-processing and/or re-capturing image data before a failure to derive meaningful data is promulgated up through the system. It should be further appreciated that these configuration changes to the image sensor 202 can be combined or otherwise used with the ISP configuration parameters applied based on CV context selection 508.

Example System

Figure 8:
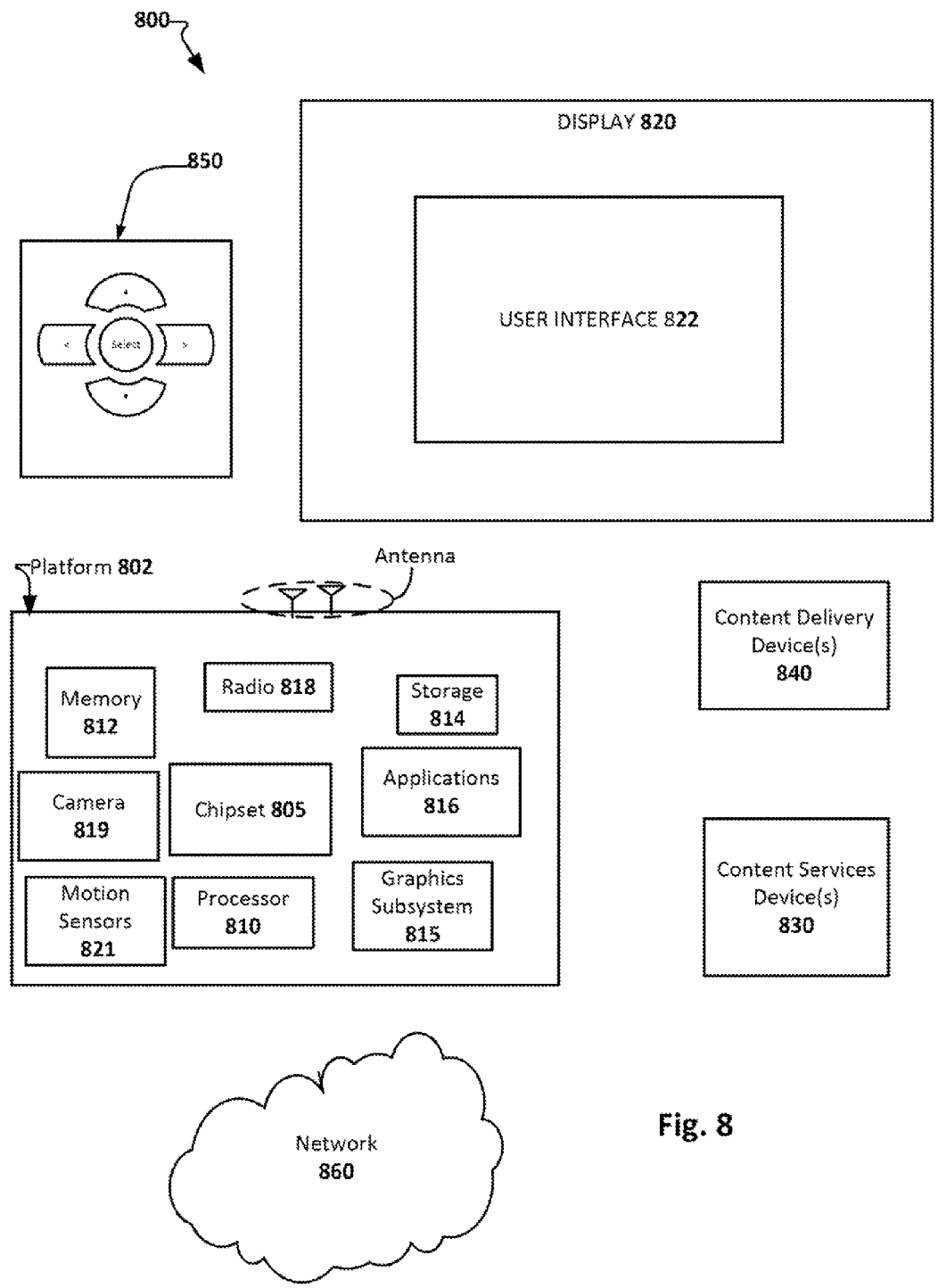
FIG. 8 illustrates a computer system configured with adaptive CV image pipeline techniques disclosed herein, in accordance with an example embodiment of the present disclosure.

FIG. 8 illustrates a computing system 800 implemented with an integrated adaptive CV pipeline using the techniques disclosed herein, in accordance with various example embodiments. In some embodiments, system 800 may be a system for capturing and/or displaying still or moving images via a camera (not shown) although system 800 is not limited to this context. For example, system 800 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820, so as to supplement navigational gesturing by the user. Each of these example components is described in more detail below.

In some embodiments, platform 802 may comprise any combination of a chipset 805, processor 810, memory 812, storage 814, graphics subsystem 815, camera 819, motion sensors 821, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 810 may comprise dual-core processor(s), dual-core mobile processor(s), and so forth. Memory 812 may be implemented, for instance, as a volatile memory device such as, but not limited to, a Random Access Memory (RAM), Dynamic Random Access Memory (DRAM), or Static RAM (SRAM). Storage 814 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 814 may comprise technology to increase the storage performance enhanced protection for valuable digital media when multiple hard drives are included, for example.

Graphics subsystem 815 may perform processing of images such as still or video for display, and in some embodiments is configured to synthesize face images, as variously described herein. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In some embodiments, content services device(s) 830 may be hosted by any national, international and/or independent service and thus accessible to platform 802 via the Internet or other network, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820. In some embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, graphics, text, medical and gaming content, and so forth.

Content services device(s) 830 receives content such as cable television programming including media information, digital information, and/or other content. Examples of content providers may include any cable or satellite television or radio or Internet content providers. The provided examples are not meant to limit the present disclosure. In some embodiments, platform 802 may receive control signals from navigation controller 850 having one or more navigation features. The navigation features of controller 850 may be used to interact with user interface 822, for example. In some embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In some embodiments, controller 850 may not be a separate component but integrated into platform 802 and/or display 820. Embodiments, however, are not limited to the elements or in the context shown or described herein, as will be appreciated.

In some embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chipset 805 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 8.

As described above, system 800 may be embodied in varying physical styles or form factors. FIG. 7 illustrates embodiments of a small form factor device 700 in which system 800 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 9:
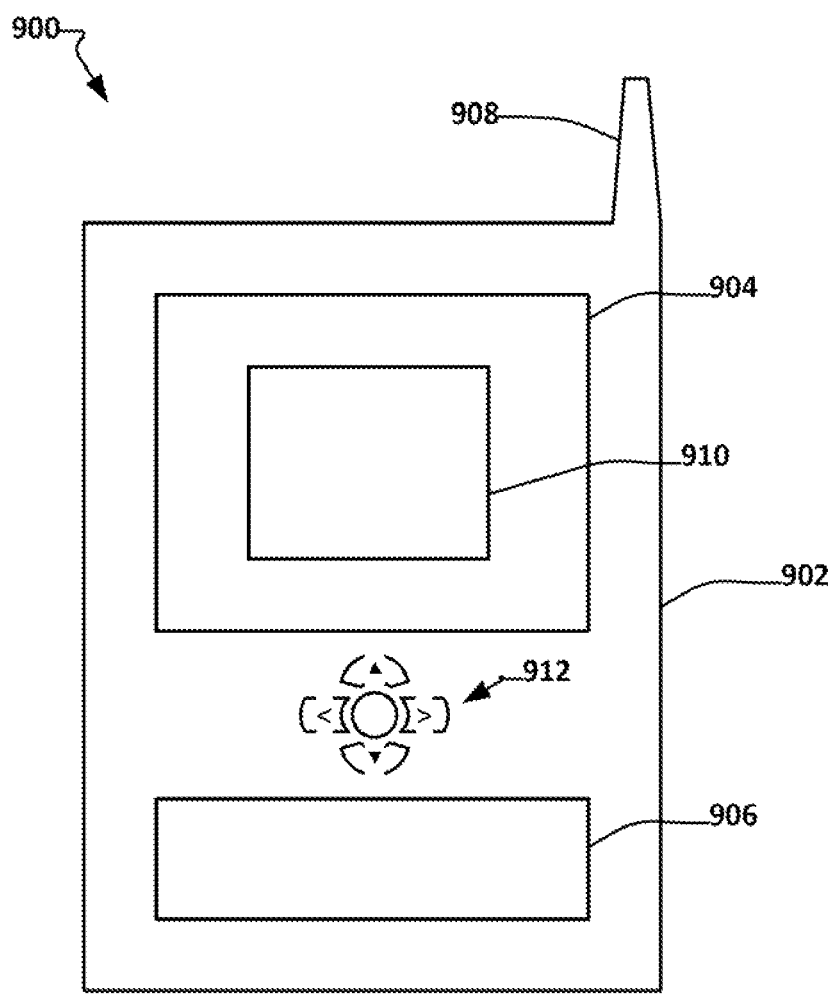
FIG. 9 shows a mobile computing system configured in accordance with an embodiment of the present disclosure.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchscreen display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is an image processing system comprising an image sensor, an image signal processor communicatively coupled to the image sensor, a signal metrics processor communicatively coupled to the image sensor and the image signal processor, the signal metrics processor configured to measure a characteristic of captured image data, and computer vision controller communicatively coupled to the signal metrics processor and configured to initiate capturing of image data in accordance with a selected computer vision task, and where the computer vision controller adjusts a configuration parameter of at least one of the image signal processor and the image sensor based in part on the measured characteristic and the selected computer vision task.

Example 2 includes the subject matter of Example 1, where the configuration parameter corresponds to an operating mode of the image sensor.

Example 3 includes the subject matter of Examples 1-2, where the operating mode of the image sensor comprises one of a burst-capture mode, a single-shot mode, and a continuous mode.

Example 4 includes the subject matter of Examples 1-3, where the image sensor comprises a first image sensor and second image sensor, and where the first image sensor and the second image sensor are configured differently.

Example 5 includes the subject matter of Examples 1-4, where the image sensor comprises a sensor configured to produce at least one of a color image signal (RGB), YUV, a color and depth image signal (RGBD), and a stereo image signal (L/R RGB).

Example 6 includes the subject matter of Examples 1-5, where the image sensor comprises a sensor configured to detect infrared energy.

Example 7 includes the subject matter of Examples 1-5, where the image sensor comprises a sensor configured to detect x-ray energy.

Example 8 includes the subject matter of Examples 1-7, where the measured characteristic comprises at least one of a sharpness value, a noise value, and a contrast value.

Example 9 includes the subject matter of Examples 1-8, where the selected computer vision task comprises at least one of an optical character recognition task, a gesture recognition task, a facial recognition task, a fiducial detection task, and an object identification task.

Example 10 includes the subject matter of Examples 1-9, where the selected computer vision task includes a corresponding computer vision task-specific configuration, the computer vision task-specific configuration comprising capture parameters including at least one of a resolution, a frame rate, and one or more post-capture image processing routines to apply.

Example 11 includes the subject matter of Example 10, where the capture parameters govern image capture via the image sensor and post-capture image processing routines of the image signal processor.

Example 12 includes the subject matter of Examples 10-11, where the image processing system further comprises a computer vision application configured to receive captured image data and perform the selected computer vision task thereon.

Example 13 includes the subject matter of Example 12, where the computer vision controller is configured to communicate with the computer vision application via a communication channel.

Example 14 includes the subject matter of Examples 12-13, where the communication channel comprises at least one of an optical interconnect, a physical bus, a RF/Wireless interconnect, a TCP socket, and a carbon nanotube interconnect.

Example 15 includes the subject matter of Examples 12-14, where the computer vision controller is configured to receive a performance indicator from the computer vision application during computer vision analysis of the captured image data.

Example 16 includes the subject matter of Example 15, where the performance indicator comprises a confidence score.

Example 17 includes the subject matter of Example 15, where the confidence score is a value between 0% and 100% relative to the success of the computer vision application deriving meaningful information from captured image data during computer vision analysis.

Example 18 includes the subject matter of Examples 16-17, where the confidence score is a binary value comprising a zero or one relative to whether the computer vision application failed or succeeded, respectively, in driving meaningful information from captured image data during computer vision analysis.

Example 19 includes the subject matter of Examples 15-18, where the computer vision controller is configured to, in response to receiving a high confidence score from the computer vision application, store the measured characteristic in a best-case image signal profile for the selected computer vision task.

Example 20 includes the subject matter of Examples 15-18, where the computer vision controller is configured to, in response to receiving a low confidence score from the computer vision application, compare the measured characteristic to a corresponding metric in a best-case image signal profile for the selected computer vision task.

Example 21 includes the subject matter of Example 20, where the computer vision controller determines if a difference between the measured characteristic and the corresponding metric exceeds a predetermined threshold.

Example 22 includes the subject matter of Example 21, where the computer vision controller is configured to attribute a signal deficiency as a cause for the low confidence score based on the difference.

Example 23 includes the subject matter of Example 22, where the computer vision controller determines a corrective configuration such that the attributed signal deficiency is compensated for by the adjusted configuration parameter.

Example 24 includes the subject matter of Example 23, where the corrective configuration comprises at least one of a change in shutter delay of the image sensor, a change in resolution of the image sensor, and a change in frame rate of the image sensor.

Example 25 includes the subject matter of Example 24, where the corrective configuration comprises enabling at least one post-processing routine in the image signal processor.

Example 26 includes the subject matter of Examples 23-24, where the corrective configuration comprises disabling at least one post-processing routine in the image signal processor.

Example 27 includes the subject matter of Examples 23-24, where the corrective configuration comprises disabling at least one post-processing routine in the image signal processor and enabling a different post-processing routine in the image signal processor.

Example 28 includes the subject matter of Examples 23-27, where the computer vision controller reprocesses previously captured image data using the corrective configuration.

Example 29 includes the subject matter of Examples 23-27, where the computer vision controller captures new image data using the corrective configuration.

Example 30 includes the subject matter of Examples 1-29, where the image processing system further comprises a motion estimation module.

Example 31 includes the subject matter of Example 30, where the motion estimation module is communicatively coupled to at least one of a gyro sensor, a positional sensor, and an accelerometer.

Example 32 includes the subject matter of Examples 30-31, where the computer vision controller is communicatively coupled to the motion estimation module, and where the computer vision controller adjusts the configuration parameter of at least one of the image signal processor and the image sensor based further in part on estimated motion received from the motion estimation module.

Example 33 includes the subject matter of Example 32, where the adjusted configuration parameter changes a capture mode of the image sensor based on the estimated motion.

Example 34 includes the subject matter of Example 33, where the capture mode is changed to a burst-mode capture based on the estimated motion.

Example 35 includes the subject matter of Examples 32-34, where the adjusted configuration parameter enables a post-processing routine of the image signal processor based on the estimated motion.

Example 36 includes the subject matter of Example 35, where the enabled post-processing routine comprises an image stabilization routine.

Example 37 includes the subject matter of Example 30-36, where the computer vision controller is configured to prevent image capture while receiving an indication motion is occurring by the motion estimation module.

Example 38 includes the subject matter of Examples 1-37, where the image processing system further comprises a power and workload controller associated with a power policy, and where the computer vision controller is further configured to adjust the configuration parameter of at least one of the image signal processor and the image sensor based on the power policy.

Example 39 includes the subject matter of Example 38, where the power policy comprises a low-power profile such that image data is captured in at least one of a low-resolution and a low frame rate by the image sensor.

Example 40 includes the subject matter of Examples 38-39, where the low-power profile governs a maximum number of post-processing routines and types of post-processing routines applied by the image signal processor based on an estimated power consumption value.

Example 41 includes the subject matter of Examples 38-40, where the power and workload controller is further associated with a computer vision task-specific power profile corresponding to each type of computer vision task supported by the image processing system, and where each computer vision task-specific power profile includes an estimated power consumption value.

Example 42 includes the subject matter of Example 41, where the estimated power consumption comprises a milliWatt per frame power estimation value.

Example 43 includes the subject matter of Example 41-42, where each type of computer vision task supported by the computer vision controller is associated with a plurality of corresponding computer vision task-specific power profiles including at least one of a low-power, medium-power, and high-power configuration Example 44 includes the subject matter of Example 1-43, where the image processing system is further configured to dynamically adjust at least one of the image sensor and the image signal processor according to computer vision tasks to be performed.

Example 45 is an electronic device comprising an image pipeline comprising the image processing system as defined in any of the preceding examples.

Example 46 is a system-on-chip device comprising the image processing system as defined in any of the preceding examples.

Example 47 is a mobile computing device comprising the image processing system as defined in any of the preceding examples.

Example 48 includes the subject matter of Example 47, where the mobile computing device is at least one of a wearable computing device, a laptop computer, a smart phone, and a tablet computer.

Example 49 is a computer-implemented method for image processing, the method comprising capturing image data by an image sensor in accordance with performance requirements of a selected computer vision task, measuring a characteristic of the captured image data, determining a difference between the measured characteristic and a corresponding metric; and adjusting a first configuration parameter of at least one of an image signal processor and the image sensor based in part on the difference.

Example 50 includes the subject matter of Example 49, where the measured characteristic comprises at least one of a sharpness value, a noise value, and a contrast value.

Example 51 includes the subject matter of Examples 49-50, where the selected computer vision task comprises at least one of an optical character recognition task, a gesture recognition task, a facial recognition task, a fiducial detection task, and an object identification task.

Example 52 includes the subject matter of Examples 49-51, where the selected computer vision task includes a corresponding computer vision task-specific configuration, the computer vision task-specific configuration comprising capture parameters including at least one of a resolution, a frame rate, and one or more post-capture image processing routines to apply.

Example 53 includes the subject matter of Example 52, where the capture parameters govern image capture via the image sensor and post-capture image processing routines of the image signal processor.

Example 54 includes the subject matter of Example 49-53, where the selected computer vision task is based on input from a computer vision application.

Example 55 includes the subject matter of Example 54, where the selected computer vision task is received from the computer vision application at an onset of computer vision processing.

Example 56 includes the subject matter of Examples 54-55, further including receiving a performance indicator from the computer vision application during computer vision analysis of the captured image data.

Example 57 includes the subject matter of Example 56, where the performance indicator comprises a confidence score.

Example 58 includes the subject matter of Examples 57, where the confidence score comprises a value between 0% and 100% relative to the success of the computer vision application deriving meaningful information from captured image data during computer vision analysis.

Example 59 includes the subject matter of Examples 57-58, where the confidence score comprises a binary value of zero or one relative to whether the computer vision application failed or succeeded, respectively, to derive meaningful information from captured image data during computer vision analysis.

Example 60 includes the subject matter of Examples 57-59, further including an act of storing, in response to receiving a high confidence score from the computer vision application, the measured characteristic in a best-case image signal profile for the selected computer vision task.

Example 61 includes the subject matter of Examples 57-60, further including an act of comparing, in response to receiving a low confidence score from the computer vision application, the measured characteristic to a corresponding metric in a best-case image signal profile for the selected computer vision task.

Example 62 includes the subject matter of Example 61, further including an act of determining whether a difference between the measured characteristic and the corresponding metric exceeds a predetermined threshold.

Example 63 includes the subject matter of Example 62, further including an act of attributing a signal deficiency as a cause for the low confidence score based on the difference exceeding the predetermined threshold.

Example 64 includes the subject matter of Example 63, further including an act of determining a corrective configuration such that the attributed signal deficiency is compensated for by the adjusted first configuration parameter.

Example 65 includes the subject matter of Example 64, where the corrective configuration is applied only to a region of interest within the captured image data.

Example 66 includes the subject matter of Example 65, where the region of interest is based on a pixel weighting scheme.

Example 67 includes the subject matter of Example 64-66, further including an act of applying the corrective configuration to an image signal processor such that previously captured image data is reprocessed.

Example 68 includes the subject matter of Example 67, where the image signal processor reprocesses only a region of interest as determined by a pixel weighting scheme.

Example 69 includes the subject matter of Examples 64-68, where the corrective configuration comprises enabling at least one post-processing routine in the image signal processor.

Example 70 includes the subject matter of Examples 64-69, where the corrective configuration comprises disabling at least one post-processing routine in the image signal processor.

Example 71 includes the subject matter of Examples 64-70, where the corrective configuration comprises disabling at least one post-processing routine in the image signal processor and enabling a different post-processing routine in the image signal processor.

Example 72 includes the subject matter of Examples 49-71, including receiving motion estimation from a motion estimation module, and adjusting a second configuration parameter of at least one of the image signal processor and the image sensor based on the motion estimation.

Example 73 includes the subject matter of Example 72, where the second configuration parameter is a capture mode of the image sensor, and where adjusting the second configuration parameter comprises changing the capture mode of the image sensor to at least one of a burst-capture mode, a continuous-capture mode, and a single-shot capture mode.

Example 74 includes the subject matter of Examples 72-73, where the second configuration parameter comprises one or more post-capture routines to apply to captured image data by the image signal processor, and where adjusting the second configuration parameter includes enabling an image stabilization routine.

Example 75 includes the subject matter of Examples 72-74, where the second configuration parameter disables image capture in response to the motion estimation module detecting a substantial amount motion.

Example 76 includes the subject matter of Examples 49-75, further including an act of determining a power policy for an electronic device.

Example 77 includes the subject matter of Example 76, where adjusting the first configuration parameter of at least one of the image signal processor and the image sensor based is further based on limits set forth by the power policy.

Example 78 includes the subject matter of Example 77, where the limits set forth by the power policy include at least one of a maximum frame rate, a maximum resolution, and which post-processing routines can be applied to captured image data.

Example 79 includes the subject matter of Examples 77-78, where the power policy comprises a low-power profile, the method further including an act of determining if the first adjusted configuration parameter exceeds a limit governed by the low-power profile.

Example 80 includes the subject matter of Example 79, where the first adjusted configuration parameter is set to the limit governed by the low-power profile in response to determining the first adjusted configuration parameter exceeds the limit governed by the low-power profile.

Example 81 is a non-transient computer program product encoded with instructions that when executed by one or more processors cause a process to be carried out, the process comprising capturing image data by an image sensor in accordance with performance requirements of a selected computer vision task, measuring a characteristic of the captured image data, determining a difference between the measured characteristic and a corresponding metric, and adjusting a first configuration parameter of at least one of an image signal processor and an image sensor based in part on the difference.

Example 82 includes the subject matter of Example 81, where the measured characteristic comprises at least one of a sharpness value, a noise value, and a contrast value.

Example 83 includes the subject matter of Examples 81-82, where the selected computer vision task comprises at least one of an optical character recognition task, a gesture recognition task, a facial recognition task, a fiducial detection task, and an object identification task.

Example 84 includes the subject matter of Examples 81-83, where the selected computer vision task includes a corresponding computer vision task-specific configuration, the computer vision task-specific configuration comprising capture parameters including at least one of a resolution, a frame rate, and one or more post-capture image processing routines to apply.

Example 85 includes the subject matter of Examples 81-84, where the selected computer vision task is dynamically changed in response detecting a different computer vision context, where the different computer vision context is determined based on recognizing at least one element in the captured image data.

Example 86 includes the subject matter of Example 85, where the at least one recognized element comprises at least one of a human face, a character, a hand, an object, and a fiducial.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An image processing system comprising:
   an image sensor;
   an image signal processor communicatively coupled to the image sensor;
   a memory storing a configuration parameter of at least one of the image sensor and the image signal processor, the configuration parameter controlling performance and power consumption of the at least one of the image sensor and the image signal processor;
   a signal metrics processor communicatively coupled to the image sensor and the image signal processor, the signal metrics processor configured to measure a characteristic of captured image data; and
   a computer vision controller communicatively coupled to the signal metrics processor and configured to initiate capturing of image data in accordance with a selected computer vision task, wherein the computer vision controller is configured to receive information descriptive of performance requirements of the selected computer vision task and to adjust the configuration parameter of the at least one of the image signal processor and the image sensor based in part on the information descriptive of the performance requirements of the selected computer vision task, thereby causing the at least one of the image sensor and the image signal processor to consume power varying with the performance requirements of the selected computer vision task.

2. The image processing system of claim 1, wherein the image sensor comprises a sensor configured to produce at least one of a color image signal (RGB), a color and depth image signal (RGBD), a YUV color image signal, and a stereo image signal (L/R RGB).

3. The image processing system of claim 1, wherein the measured characteristic comprises at least one of a sharpness value, a noise value, and a contrast value.

4. The image processing system of claim 1, wherein the selected computer vision task includes a corresponding computer vision task-specific configuration, the computer vision task-specific configuration comprising capture parameters including at least one of a resolution, a frame rate, and one or more post-capture image processing routines to apply.

5. The image processing system of claim 1, wherein the computer vision controller is configured to receive a performance indicator from a computer vision application during computer vision analysis of a measured image signal characteristic of the captured image data.

6. The image processing system of claim 5, wherein the computer vision controller is configured to, in response to receiving a high confidence score from the computer vision application, store the measured characteristic in a best-case image signal profile for the selected computer vision task.

7. The image processing system of claim 5, wherein the computer vision controller is configured to, in response to receiving a low confidence score from the computer vision application, compare the measured characteristic to a corresponding metric in a best-case image signal profile for the selected computer vision task.

8. The image processing system of claim 7, wherein the computer vision controller determines if a difference between the measured characteristic and the corresponding metric exceeds a predetermined threshold, and wherein the computer vision controller is configured to attribute a signal deficiency as a cause for the low confidence score based on the difference.

9. The image processing system of claim 8, wherein the computer vision controller determines a corrective configuration such that the attributed signal deficiency is compensated for by the adjusted configuration parameter, wherein the corrective configuration comprises at least one of a change in shutter delay of the image sensor, a change in resolution of the image sensor, and a change in frame rate of the image sensor.

10. The image processing system of claim 9, wherein the corrective configuration further comprises at least one of enabling at least one post-processing routine in the image signal processor and disabling at least one post-processing routine in the image signal processor, and wherein the corrective configuration is selected based on a low-power profile.

11. The image processing system of claim 9, wherein the computer vision controller reprocesses previously captured image data using the corrective configuration.

12. A computer-implemented method for image processing, the method comprising:
   receiving information descriptive of performance requirements of a selected computer vision task;
   adjusting a first configuration parameter of at least one of an image signal processor and an image sensor based in part on the information descriptive of the performance requirements of the selected computer vision task;
   initiating capturing of image data by the image sensor in accordance with the performance requirements of the selected computer vision task;

measuring a characteristic of the captured image data;
determining a difference between the measured characteristic and a corresponding metric; and
adjusting the first configuration parameter of at least one of the image signal processor and the image sensor based in part on the difference, thereby causing the at least one of the image sensor and the image signal processor to consume power varying with the difference.

13. The method of claim 12, further comprising comparing, in response to receiving a low confidence score from a computer vision application, the measured characteristic to a corresponding metric in a best-case image signal profile for the selected computer vision task.

14. The method of claim 13, further comprising attributing a signal deficiency as a cause for the low confidence score and determining a corrective configuration such that the attributed signal deficiency is compensated for by the adjusted first configuration parameter.

15. The method of claim 12, further comprising:
receiving motion estimation from a motion estimation module; and
adjusting a second configuration parameter of at least one of the image signal processor and the image sensor based on the motion estimation.

16. The method of claim 15, wherein the second configuration parameter is a capture mode of the image sensor, and wherein adjusting the second configuration parameter comprises changing the capture mode of the image sensor to at least one of a burst-capture mode, a continuous-capture mode, and a single-shot capture mode.

17. The method of claim 15, wherein the second configuration parameter comprises one or more post-capture routines to apply to captured image data by the image signal processor, and wherein adjusting the second configuration parameter includes enabling an image stabilization routine.

18. A non-transitory computer program product encoded with instructions that when executed by one or more processors cause a process to be carried out, the process comprising:
receiving information descriptive of performance requirements of a selected computer vision task;
adjusting a first configuration parameter of at least one of an image signal processor and an image sensor based in part on the information descriptive of the performance requirements of the selected computer vision task;
initiating capturing of image data by an the image sensor in accordance with the performance requirements of a the selected computer vision task;
measuring a characteristic of the captured image data;
determining a difference between the measured characteristic and a corresponding metric; and
adjusting the first configuration parameter of at least one of an the image signal processor and an the image sensor based in part on the difference, thereby causing the at least one of the image sensor and the image signal processor to consume power varying with the difference.

19. The non-transitory computer program product encoded with instructions of claim 18, wherein the selected computer vision task is dynamically changed in response to detecting a different computer vision context, wherein the different computer vision context is determined based on recognizing at least one element in the captured image data.

20. The non-transitory computer program product encoded with instructions of claim 19, wherein the at least one recognized element comprises at least one of a human face, a character, a hand, an object, and a fiducial.

* * * * *